US012696108B2

(12) United States Patent
Kumar et al.

(10) Patent No.: US 12,696,108 B2
(45) Date of Patent: Jul. 28, 2026

(54) CROSS-NODE ARTIFICIAL INTELLIGENCE (AI)/MACHINE LEARNING (ML) SERVICES

(71) Applicant: QUALCOMM Incorporated, San Diego, CA (US)

(72) Inventors: Rajeev Kumar, San Diego, CA (US); Aziz Gholmieh, Del Mar, CA (US); Gavin Bernard Horn, La Jolla, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/473,167

(22) Filed: Sep. 22, 2023

(65) Prior Publication Data

US 2025/0106650 A1 Mar. 27, 2025

(51) Int. Cl.
*H04W 24/02* (2009.01)
*H04W 8/24* (2009.01)
*H04W 24/10* (2009.01)

(52) U.S. Cl.
CPC ............. *H04W 24/02* (2013.01); *H04W 8/24* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2022/0248312 A1* | 8/2022 | Bai | ........................ | G06N 20/20 |
| 2023/0100253 A1* | 3/2023 | Zhu | ...................... | G06N 3/0464 |
| | | | | 706/26 |
| 2025/0081033 A1* | 3/2025 | Yang | ................. | H04W 28/0268 |

FOREIGN PATENT DOCUMENTS

| | | |
|---|---|---|
| WO | WO-2022182330 A1 | 9/2022 |
| WO | WO-2022222089 A1 | 10/2022 |
| WO | WO-2023148009 A1 | 8/2023 |

OTHER PUBLICATIONS

International Search Report and Written Opinion—PCT/US2024/043900—ISA/EPO—Dec. 12, 2024.

(Continued)

*Primary Examiner* — Adolf Dsouza
(74) *Attorney, Agent, or Firm* — Holland & Hart LLP /Qualcomm

(57) ABSTRACT

Methods, systems, and devices for wireless communications are described. A network entity may obtain a first message indicating one or more artificial intelligence (AI)/machine learning (ML) capabilities of a user equipment (UE) and may further obtain, from an AI/ML service, a second message indicating one or more AI/ML service capabilities of the AI/ML service. The network entity may output a control message indicating one or more cross-node AI/ML configurations based on the one or more AI/ML capabilities of the UE and the one or more AI/ML service capabilities of the AI/ML service. The one or more cross-node AI/ML configurations may configure AI/ML functions of the UE for use with the AI/ML service. In some examples, life cycle management (LCM) procedures may be triggered by a UE, and the UE may transmit signaling associated with the LCM procedures (e.g., a request for LCM signaling or an indication of LCM).

30 Claims, 22 Drawing Sheets

(56) References Cited

OTHER PUBLICATIONS

LENOVO: "Discussion On General Aspects of AI/ML Framework", 3GPP TSG RAN WG1 #113, R1-2305201, 3rd Generation Partnership Project, Mobile Competence Centre, 650, Route Des Lucioles, F-06921 Sophia-Antipolis Cedex, France, vol. 3GPP RAN 1, No. Incheon, Korea, May 22, 2023-May 26, 2023, 16 Pages, May 21, 2023, XP052394133, The whole document.
Partial International Search Report—PCT/US2024/043900—ISA/EPO—Oct. 21, 2024.

* cited by examiner

AI/ML input data 805

Inference    810

Model output 815

Monitoring input data 825

Monitor    820

Monitoring report 830
(Feedback KPIs)

800

1110

1120

1115

1105

1100

130

105

115

Network
Entity

Transceiver

1410

Antenna

1415

Communications
Manager

1420

Memory

Code

1430

1425

1440

Processor

1435

1405

1400

Receiver

1510

Communications Manager

1520

Transmitter

1515

1505

1500

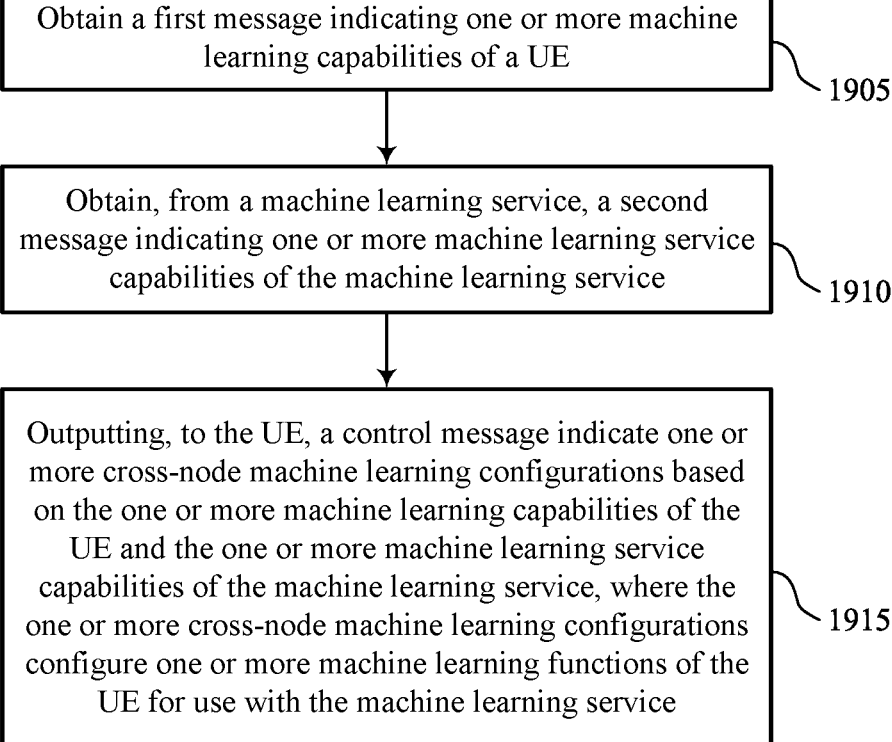

Obtain a first message indicating one or more machine learning capabilities of a UE

1905

Obtain, from a machine learning service, a second message indicating one or more machine learning service capabilities of the machine learning service

1910

Outputting, to the UE, a control message indicate one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service

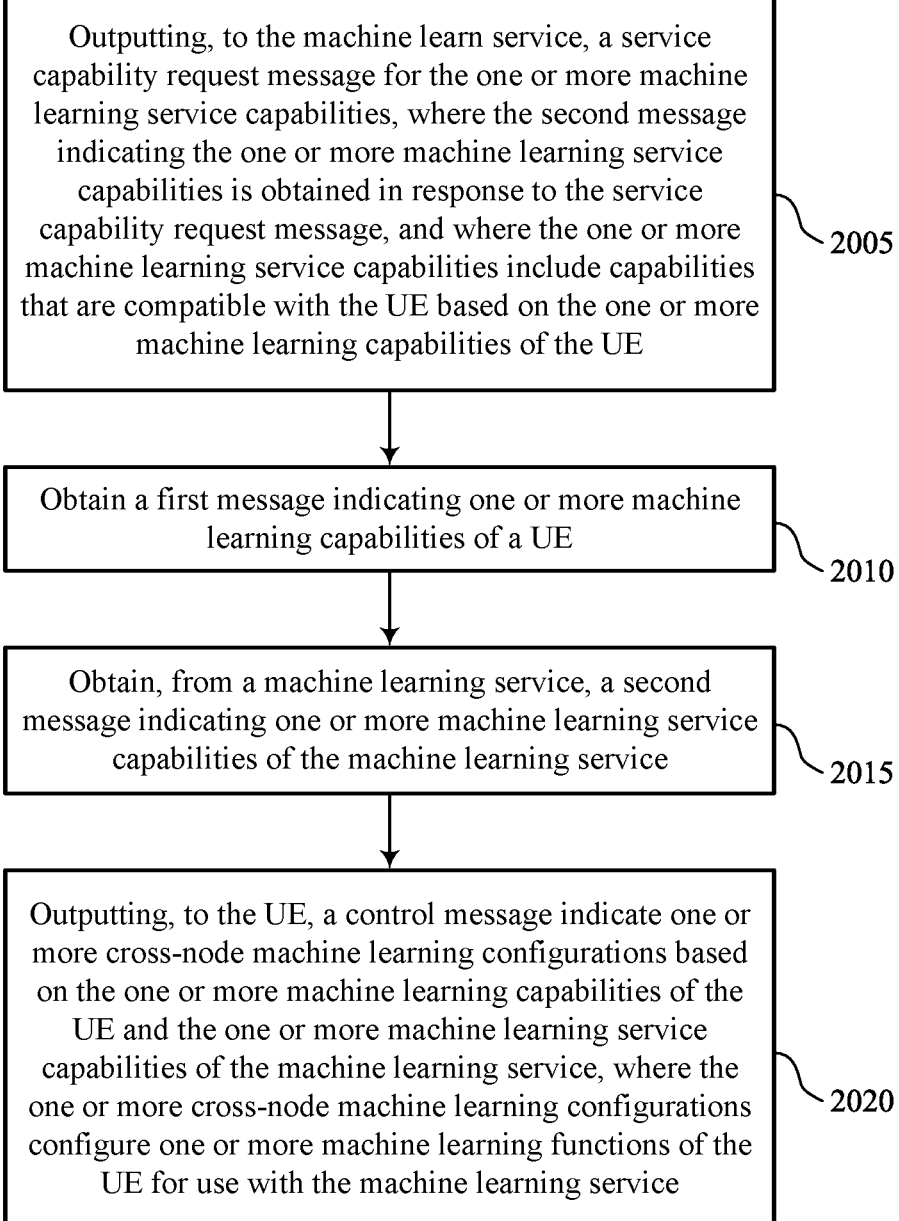

Outputting, to the machine learn service, a service capability request message for the one or more machine learning service capabilities, where the second message indicating the one or more machine learning service capabilities is obtained in response to the service capability request message, and where the one or more machine learning service capabilities include capabilities that are compatible with the UE based on the one or more machine learning capabilities of the UE

2005

Obtain a first message indicating one or more machine learning capabilities of a UE

2010

Obtain, from a machine learning service, a second message indicating one or more machine learning service capabilities of the machine learning service

2015

Outputting, to the UE, a control message indicate one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service

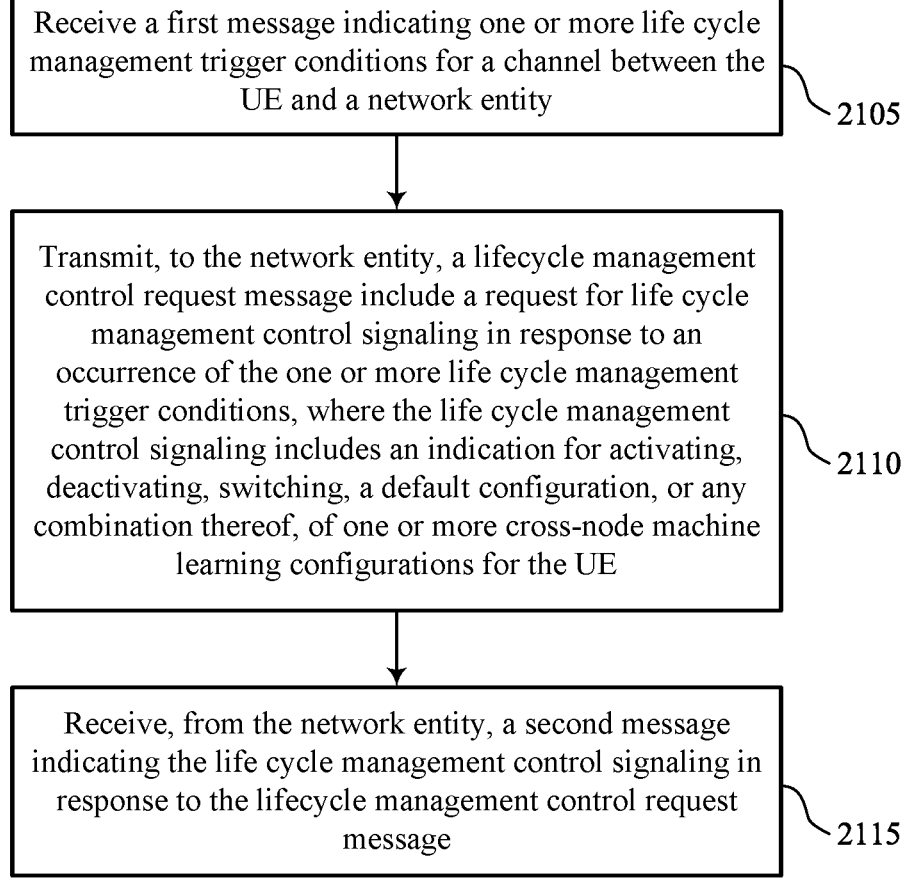

Receive a first message indicating one or more life cycle management trigger conditions for a channel between the UE and a network entity

2105

Transmit, to the network entity, a lifecycle management control request message include a request for life cycle management control signaling in response to an occurrence of the one or more life cycle management trigger conditions, where the life cycle management control signaling includes an indication for activating, deactivating, switching, a default configuration, or any combination thereof, of one or more cross-node machine learning configurations for the UE

2110

Receive, from the network entity, a second message indicating the life cycle management control signaling in response to the lifecycle management control request message

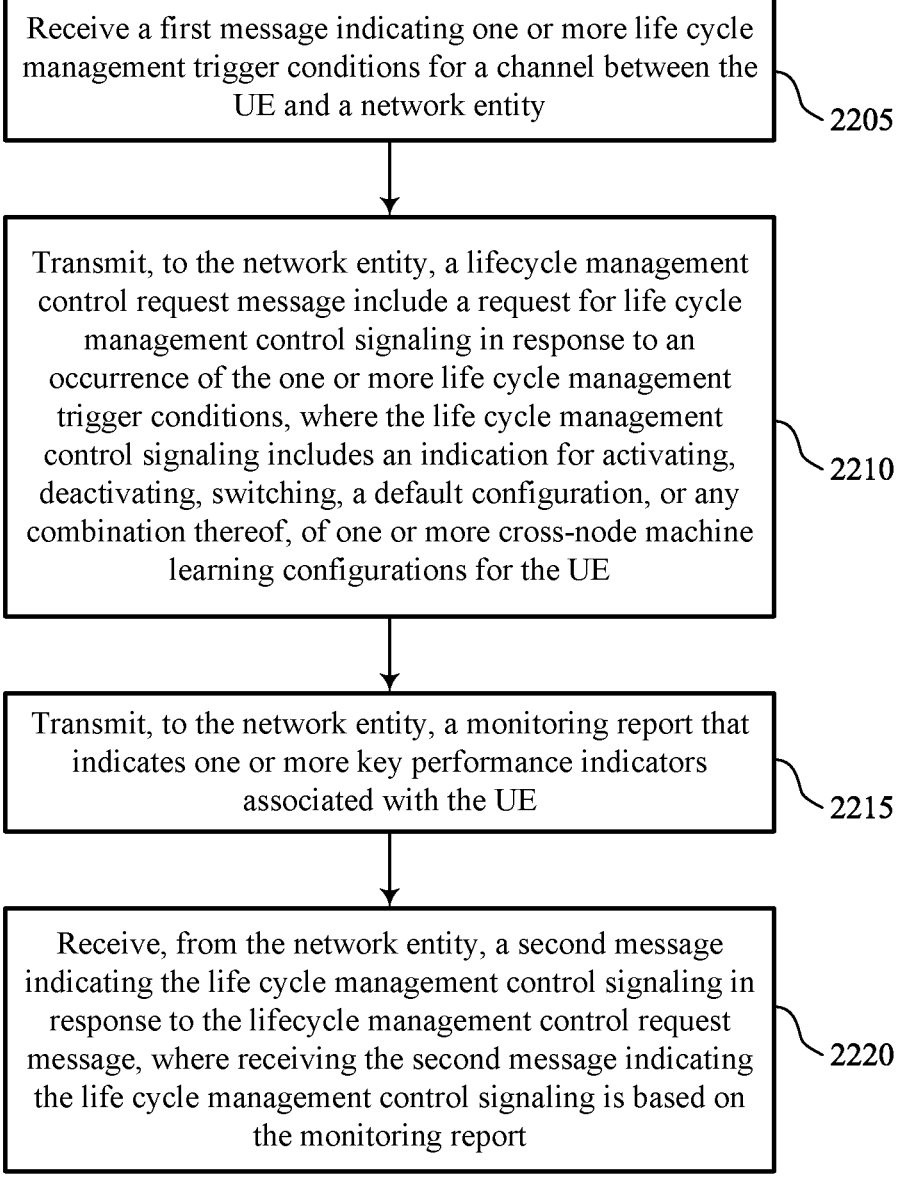

Receive a first message indicating one or more life cycle
management trigger conditions for a channel between the
UE and a network entity                                              2205

Transmit, to the network entity, a lifecycle management
control request message include a request for life cycle
management control signaling in response to an
occurrence of the one or more life cycle management
trigger conditions, where the life cycle management
control signaling includes an indication for activating,            2210
deactivating, switching, a default configuration, or any
combination thereof, of one or more cross-node machine
learning configurations for the UE Transmit, to the network entity, a monitoring report that
indicates one or more key performance indicators
associated with the UE                                              2215

Receive, from the network entity, a second message
indicating the life cycle management control signaling in
response to the lifecycle management control request
message, where receiving the second message indicating             2220
the life cycle management control signaling is based on
the monitoring report

CROSS-NODE ARTIFICIAL INTELLIGENCE (AI)/MACHINE LEARNING (ML) SERVICES

FIELD OF TECHNOLOGY

The following relates to wireless communications, including cross-node artificial intelligence/machine learning services.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support artificial intelligence (AI)/machine learning (ML) functions or models at devices communicating in the wireless communications system, such as a UE, a network entity (e.g., a radio access network (RAN)), and an AI/ML service. For example, various devices may support one or more AI/ML models for optimizing communications in the wireless communications systems (e.g., efficient network energy saving, beam management, load balancing, and mobility optimization).

SUMMARY

The described techniques relate to improved methods, systems, devices, and apparatuses that support cross-node artificial intelligence (AI)/machine learning (ML) services. A user equipment (UE) may communicate UE ML capabilities (e.g., AI/ML capabilities) to the radio access network (RAN) and the ML service (e.g., AI/ML service) may also provide ML service ML capabilities to the RAN. The RAN may facilitate cross-node configuration, cross-node ML inference, and/or performance monitoring based on the UE ML capabilities and the ML service ML capabilities. By relaying the information between the UE and the ML service, the UE may indirectly communicate with the ML service so that the UE may be updated with ML models that facilitate the UE in performing as expected (e.g., above a performance threshold) and as compatible with the ML service. Additionally, or alternatively, a UE may request signaling associated with life cycle management (LCM) procedures for maintaining a wireless communication link with the network entity. In some examples, the UE may perform the LCM procedures and transmit an indication of the LCM procedures to the AI/ML service (e.g., via the network entity). In other examples, the UE may transmit a request (e.g., via the network entity) for the ML service to perform the LCM procedures, where the UE may, in some cases, include a monitoring report with the request.

A method for wireless communications by a network entity is described. The method may include obtaining a first message indicating one or more machine learning capabilities of a UE, obtaining, from an ML service, a second message indicating one or more ML service capabilities of the ML service, and outputting, to the UE, a control message indicating one or more cross-node machine learning configurations based on the one or more machine learning capabilities of the UE and the one or more ML service capabilities of the ML service, where the one or more cross-node machine learning configurations configure one or more machine learning functions of the UE for use with the ML service.

A network entity for wireless communications is described. The network entity may include one or more memories storing processor executable code, and one or more processors coupled with the one or more memories. The one or more processors may individually or collectively operable to execute the code to cause the network entity to obtain a first message indicating one or more machine learning capabilities of a UE, obtain, from an ML service, a second message indicating one or more ML service capabilities of the ML service, and outputting, to the UE, a control message indicate one or more cross-node machine learning configurations based on the one or more machine learning capabilities of the UE and the one or more ML service capabilities of the ML service, where the one or more cross-node machine learning configurations configure one or more machine learning functions of the UE for use with the ML service.

Another network entity for wireless communications is described. The network entity may include means for obtaining a first message indicating one or more machine learning capabilities of a UE, means for obtaining, from an ML service, a second message indicating one or more ML service capabilities of the ML service, and means for outputting, to the UE, a control message indicating one or more cross-node machine learning configurations based on the one or more machine learning capabilities of the UE and the one or more ML service capabilities of the ML service, where the one or more cross-node machine learning configurations configure one or more machine learning functions of the UE for use with the ML service.

A non-transitory computer-readable medium storing code for wireless communications is described. The code may include instructions executable by a processor to obtain a first message indicating one or more machine learning capabilities of a UE, obtain, from an ML service, a second message indicating one or more ML service capabilities of the ML service, and outputting, to the UE, a control message indicate one or more cross-node machine learning configurations based on the one or more machine learning capabilities of the UE and the one or more ML service capabilities of the ML service, where the one or more cross-node machine learning configurations configure one or more machine learning functions of the UE for use with the ML service.

In some examples of the method, network entities, and non-transitory computer-readable medium described herein, outputting, to the ML service, a service capability request message for the one or more ML service capabilities, where the second message indicating the one or more ML service capabilities may be obtained in response to the service capability request message, and where the one or more ML service capabilities include capabilities that may be compatible with the UE based on the one or more machine learning capabilities of the UE.

In some examples of the method, network entities, and non-transitory computer-readable medium described herein, the service capability request message includes a set of UE identifiers including an identifier of the UE, an indication of the one or more machine learning capabilities of to the UE, or any combination thereof.

In some examples of the method, network entities, and non-transitory computer-readable medium described herein, obtaining the second message indicating the one or more ML service capabilities may include operations, features, means, or instructions for obtaining, from the ML service, an announcement of the one or more ML service capabilities, the announcement including the second message.

Some examples of the method, network entities, and non-transitory computer-readable medium described herein may further include operations, features, means, or instructions for selecting, based on the one or more machine learning capabilities of the UE and the one or more ML service capabilities of the ML service, the one or more machine learning functions, outputting, to the ML service, a configuration request message requesting one or more cross-node machine learning configurations based on the selecting, and obtaining, from the ML service, a configuration response message that indicates the one or more cross-node machine learning configurations, the one or more machine learning functions, a set of UE identifiers including an identifier of the UE, or any combination thereof, where the control message indicating one or more cross-node machine learning configurations may be based on obtaining the configuration response message.

Some examples of the method, network entities, and non-transitory computer-readable medium described herein may further include operations, features, means, or instructions for obtaining a third message indicating completion of the one or more cross-node machine learning configurations by the UE in response to the control message.

In some examples of the method, network entities, and non-transitory computer-readable medium described herein, outputting, to the ML service, a fourth message indicating that the one or more cross-node machine learning configurations may have been configured by the UE.

Some examples of the method, network entities, and non-transitory computer-readable medium described herein may further include operations, features, means, or instructions for outputting a second control message including an indication to activate the one or more machine learning functions based on the one or more cross-node machine learning configurations.

In some examples of the method, network entities, and non-transitory computer-readable medium described herein, outputting, to the ML service, an activation request message indicating a set of UE identifiers including an identifier of the UE, the one or more machine learning functions, or any combination thereof and obtaining, from the ML service, an activation acknowledgment message from the ML service in response to the activation request message, the activation acknowledgment message indicating the set of UE identifiers including the identifier of the UE, the one or more machine learning functions, or any combination thereof, where the second control message may be output based on the activation acknowledgment message.

Some examples of the method, network entities, and non-transitory computer-readable medium described herein may further include operations, features, means, or instructions for obtaining, from the ML service, an activation request message indicating a set of UE identifiers including an identifier of the UE, the one or more machine learning functions, or any combination thereof and outputting, to the ML service, an activation acknowledgment message from the ML service in response to the activation request message, the activation acknowledgment message indicating the set of UE identifiers including the identifier of the UE, the one or more machine learning functions, or any combination thereof, where the second control message may be output based on the activation acknowledgment message.

Some examples of the method, network entities, and non-transitory computer-readable medium described herein may further include operations, features, means, or instructions for obtaining, from the UE, a first activation request message indicating the one or more machine learning functions, outputting, to the ML service and in response to the first activation request message, a second activation request message indicating a set of UE identifiers including an identifier of the UE, the one or more machine learning functions, or any combination thereof, and obtaining an activation acknowledgment message from the ML service in response to the second activation request message, the activation acknowledgment message indicating the set of UE identifiers including the identifier of the UE, the one or more machine learning functions, or any combination thereof, where the second control message may be output based on the activation acknowledgment message.

Some examples of the method, network entities, and non-transitory computer-readable medium described herein may further include operations, features, means, or instructions for obtaining a sixth message including UE inference input data associated with the one or more machine learning functions, outputting, to the ML service, a service data request message including the UE inference input data, and obtaining, from the ML service, a service data response message indicating ML service inference output data associated with the one or more machine learning functions.

In some examples of the method, network entities, and non-transitory computer-readable medium described herein, outputting, to the UE, a seventh message including the ML service inference output data from the ML service.

Some examples of the method, network entities, and non-transitory computer-readable medium described herein may further include operations, features, means, or instructions for monitoring for one or more trigger conditions based on the UE inference input data, ML service inference input data from the ML service, or any combination thereof and outputting, to the UE, a third control message including an indication to switch or deactivate at least one of the one or more machine learning functions based on an occurrence of the one or more trigger conditions.

In some examples of the method, network entities, and non-transitory computer-readable medium described herein, the one or more trigger conditions includes a measurement of one or more key performance indicators satisfying a key performance indicator threshold.

In some examples of the method, network entities, and non-transitory computer-readable medium described herein, outputting, to the ML service, a monitoring report that indicates one or more key performance indicators associated with the one or more machine learning functions.

In some examples of the method, network entities, and non-transitory computer-readable medium described herein, the one or more trigger conditions may be based on a monitoring report including measurements performed by the UE, by the network entity, or any combination thereof.

Some examples of the method, network entities, and non-transitory computer-readable medium described herein may further include operations, features, means, or instructions for obtaining a monitoring report from the UE, the monitoring report including one or more key performance indicators associated with the one or more machine learning functions and outputting, to the UE, an indication to switch or deactivate the one or more machine learning functions of the UE based on an occurrence of one or more trigger conditions.

In some examples of the method, network entities, and non-transitory computer-readable medium described herein, outputting, to the ML service, a monitoring report that indicates one or more key performance indicators associated with the one or more machine learning functions.

Some examples of the method, network entities, and non-transitory computer-readable medium described herein may further include operations, features, means, or instructions for obtaining, from the UE, LCM control request message including a request for life cycle management control signaling, the life cycle management control signaling including an indication for activating, deactivating, switching, a default configuration, or any combination thereof, of the one or more cross-node machine learning configurations, outputting, to the ML service, a first LCM control message including an indication of request for the life cycle management control signaling in response to the LCM control request message, and outputting, to the UE, a second LCM control message including and indication of the life cycle management control signaling indicated by the ML service.

Some examples of the method, network entities, and non-transitory computer-readable medium described herein may further include operations, features, means, or instructions for obtaining the LCM control request message may be based on a monitoring report from the UE, the network entity, or a combination thereof.

A method for wireless communications by a UE is described. The method may include receiving a first message indicating one or more life cycle management trigger conditions for a channel between the UE and a network entity, transmitting, to the network entity, a LCM control request message including a request for life cycle management control signaling in response to an occurrence of the one or more life cycle management trigger conditions, where the life cycle management control signaling includes an indication for activating, deactivating, switching, a default configuration, or any combination thereof, of one or more cross-node machine learning configurations for the UE, and receiving, from the network entity, a second message indicating the life cycle management control signaling in response to the LCM control request message.

A UE for wireless communications is described. The UE may include one or more memories storing processor executable code, and one or more processors coupled with the one or more memories. The one or more processors may individually or collectively operable to execute the code to cause the UE to receive a first message indicating one or more life cycle management trigger conditions for a channel between the UE and a network entity, transmit, to the network entity, a LCM control request message including a request for life cycle management control signaling in response to an occurrence of the one or more life cycle management trigger conditions, where the life cycle management control signaling includes an indication for activating, deactivating, switching, a default configuration, or any combination thereof, of one or more cross-node machine learning configurations for the UE, and receive, from the network entity, a second message indicating the life cycle management control signaling in response to the LCM control request message.

Another UE for wireless communications is described. The UE may include means for receiving a first message indicating one or more life cycle management trigger conditions for a channel between the UE and a network entity, means for transmitting, to the network entity, a LCM control request message including a request for life cycle management control signaling in response to an occurrence of the one or more life cycle management trigger conditions, where the life cycle management control signaling includes an indication for activating, deactivating, switching, a default configuration, or any combination thereof, of one or more cross-node machine learning configurations for the UE, and means for receiving, from the network entity, a second message indicating the life cycle management control signaling in response to the LCM control request message.

A non-transitory computer-readable medium storing code for wireless communications is described. The code may include instructions executable by a processor to receive a first message indicating one or more life cycle management trigger conditions for a channel between the UE and a network entity, transmit, to the network entity, a LCM control request message including a request for life cycle management control signaling in response to an occurrence of the one or more life cycle management trigger conditions, where the life cycle management control signaling includes an indication for activating, deactivating, switching, a default configuration, or any combination thereof, of one or more cross-node machine learning configurations for the UE, and receive, from the network entity, a second message indicating the life cycle management control signaling in response to the LCM control request message.

Some examples of the method, UEs, and non-transitory computer-readable medium described herein may further include operations, features, means, or instructions for transmitting, to the network entity, a monitoring report that indicates one or more key performance indicators associated with the UE, where receiving the second message indicating the life cycle management control signaling may be based on the monitoring report.

In some examples of the method, UEs, and non-transitory computer-readable medium described herein, the one or more life cycle management trigger conditions include one or more thresholds associated an inference performance of the UE, one or more key performance indicators associated with the UE, or a combination thereof.

BRIEF DESCRIPTION OF THE DRAWINGS

FIGS. 19 through 22 show flowcharts illustrating methods that support cross-node AI/ML services in accordance with one or more aspects of the present disclosure.

DETAILED DESCRIPTION

Figure 1:
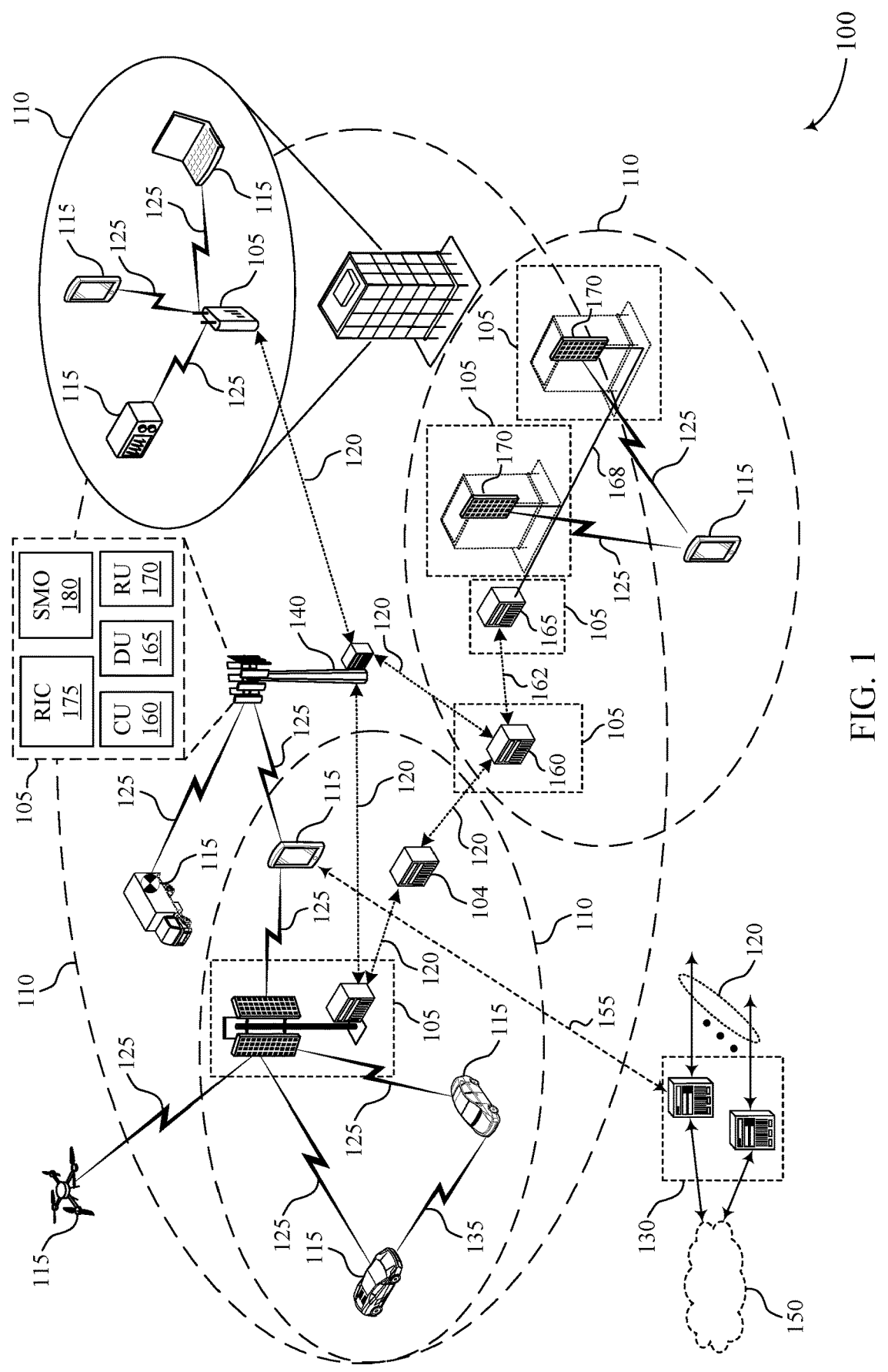
FIG. 1 shows an example of a wireless communications system that supports cross-node artificial intelligence (AI)/machine learning (ML) services in accordance with one or more aspects of the present disclosure.

Various aspects relate generally to wireless communication and more particularly to cross-node artificial intelligence (AI)/machine learning (ML) services. Some aspects more specifically relate wireless communications systems that support AI/ML operations or models at devices communicating in the wireless communications system, such as a user equipment (UE), a network entity (e.g., a radio access network (RAN)), and an AI/ML service (which may be referred to as a machine learning service). For example, the UE may support one or more AI/ML models for optimizing communications with the network entity in the wireless communications systems (e.g., channel state information (CSI) computation, beam management, load balancing, and positioning/mobility optimization). In some cases, the UE may be unaware of how the AI/ML service is deployed within a particular architecture (e.g., along with the RAN, separate from the RAN) and thus, the UE may communicate with the RAN. For instance, AI/ML functionalities may be implemented by both the RAN and the UE, where the RAN (e.g., network entity) may transmit AI/ML control signaling or input signaling, or both, to the UE, and the UE may transmit AI/ML input data to the network entity. In other examples, one or more AI/ML services that both implement and provide the one or more AI/ML models used at the UE may be deployed separate from the RAN, and the RAN (e.g., the network entity) may facilitate signaling between the UE and the AI/ML service. In any case, the deployment of AI/ML functions across multiple devices and/or entities may be referred to as cross-node inference, where AI/ML-related inference is performed by the UE as well as the AI/ML service and/or RAN.

A UE may communicate UE ML capabilities (e.g., AI/ML capabilities) to the RAN and the AI/ML service may also provide AI/ML service ML capabilities to the RAN (e.g., AI/ML service capabilities). The RAN may facilitate cross-node configuration, cross-node AI/ML inference, and/or performance monitoring based on the UE AI/ML capabilities and the AI/ML service capabilities. By relaying the information between the UE and the AI/ML service, the UE may indirectly communicate with the AI/ML service so that the UE may be updated with AI/ML models that facilitate the UE in performing as expected (e.g., above a performance threshold) and as compatible with the AI/ML service.

To exchange AI/ML capabilities with the AI/ML service, the RAN may request AI/ML service capabilities from the AI/ML service before or after receiving UE AI/ML capabilities from the UE, and the AI/ML service may provide the AI/ML service capabilities to the RAN based on the request. In some examples, the AI/ML service may announce the AI/ML service capabilities to other nodes including the RAN, without a request. For the cross-node ML configuration, the RAN may determine that the UE may be configured for cross-node AI/ML service based on capability information from the UE and the AI/ML service, and the RAN may request and obtain the configuration from the AI/ML service to provide to the UE. For cross-node ML inference, the UE may send AI/ML service input data to the RAN to forward to the AI/ML service, and the AI/ML service may provide an AI/ML service data response or output data (e.g., input/output data flow between the UE and the AI/ML service via the RAN). For performance monitoring, the UE, the RAN, and/or the AI/ML service may monitor performance (e.g., by monitoring respective key performance indicator and associated thresholds). In some examples, the UE and/or the RAN may transmit monitoring reports to the AI/ML service. The monitored conditions may cause the UE, RAN and/or the AI/ML service to activate, deactivate, or switch (e.g., new or default configuration) one or more AI/ML configurations. For example, the RAN along with the AI/ML service may control activation or deactivation of the one or more AI/ML configurations for the UE.

Particular aspects of the subject matter described in this disclosure may be implemented to realize one or more of the following potential advantages. By relaying the information between the UE and the AI/ML service, the UE may indirectly communicate with the AI/ML service so that the UE may be updated with ML models that facilitate the UE in performing as expected (e.g., above a performance threshold) and as compatible with the AI/ML service. Additionally, in some cases, the RAN may be updated with new or additional configuration to facilitate the RAN or the UE in performing as expected and as compatible with new AI/ML service. For example, the RAN may be updated to determine appropriate timing and configurations associated with the new or additional AI/ML services. The dynamic implementation of AI/ML models, for example, based on one or more system conditions, may ensure that the wireless communication system performance or AI/ML model performance is operating as expected (e.g., above a threshold). Using the appropriate AI/ML models based on changing wireless system conditions may reduce delays otherwise associated with the wireless communication system not operating as expected or from becoming incompatible with the AI/ML service.

Aspects of the disclosure are initially described in the context of wireless communications systems. Aspects of the disclosure are further illustrated by and described with reference to apparatus diagrams, system diagrams, and flowcharts that relate to cross-node AI/ML services. It is also understood that the techniques described herein may be applied to other devices or services used for processing functions or operations that are offloaded from the RAN. For example, UEs and associated services may provide offloaded processing. The UE and associated services may also be updated while the RAN may continue with the current configuration or software (e.g., with minimal or no software or configuration update). Thus, although an AI/ML service is described as an example herein, other devices and services (e.g., not performed or supported at a RAN) may utilize the same or similar techniques described herein, and some aspects described herein related to the AI/ML service should not be considered limiting to the scope of the claims or the disclosure.

FIG. 1 shows an example of a wireless communications system 100 that supports cross-node AI/ML services in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1. In some examples, a UE 115 may support AI and/or ML functionalities, which the UE 115 may use to perform wireless communications procedures (e.g., CSI prediction, beam selection or beam prediction, among other examples). For example, the UE 115 may generate inference data associated with one or more AI/ML functions. Additionally, or alternatively, the UE 115 may perform life cycle management (LCM) operations for a given AI/ML model and/or functionality (e.g., model or functionality selection, activation, deactivation, switching, and fallback, among other examples). As described herein, an AI functionality or AI model may be referred to as a ML functionality or ML model, or vice versa. That is, the terms "AI" and "ML" may, in some examples, be used interchangeably to refer to similar technologies, models, functions, or any combination thereof. In some examples, ML operations may be considered a subset of AI operations. In any case, aspects of the features described herein may be referred to as ML functionalities, ML functions, ML models, ML services, ML operations, or the like, but these aspects may be similarly applicable to AI functionalities, AI functions, AI models, AI services, AI operations, or any combination thereof. Thus, reference to "ML" herein may refer to ML, AI, or both, and the term "ML" should not be considered limiting to the scope of the claims or the disclosure.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support cross-node AI/ML services as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of Ts=1/ ($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Additionally, the UE 115, the network entity 105 (e.g., the RAN) may support artificial intelligence AI/ML operations or models. For example, the UE 115 may support one or more AI/ML models for optimizing the wireless communications systems 100. The UE 115 may be unaware of the ML service and thus, the UE 115 may communicate with the network entity 105. However, the AI/ML services may provide the one or more AI/ML models used at the UE 115. In some examples, the one or more AI/ML models associated with the UE 115 may no longer facilitate expected model or system performance (e.g., above a performance threshold). Accordingly, the UE115 may no longer provide expected optimization for the wireless communications system using the current AI/ML models.

The UE 115 may communicate UE ML capabilities (e.g., AI/ML capabilities) to the network entity 105 (e.g., the RAN) and the ML service (e.g., AI/ML service) may also provide ML service ML capabilities to the network entity 105. The network entity 105 may facilitate cross-node configuration, cross-node ML inference, and/or performance monitoring based on the UE ML capabilities and the ML service ML capabilities. By relaying the information between the UE 115 and the ML service, the UE 115 may indirectly communicate with the ML service so that the UE 115 may be updated with ML models that facilitate the UE in performing as expected (e.g., above a performance threshold) and as compatible with the ML service.

To exchange ML capabilities with the ML service, the network entity 105 may request ML service capabilities from the ML service after receiving UE ML capabilities from the UE 115, and the ML service may provide the ML service capabilities to the network entity 105 based on the request. In some examples, the ML service may announce the ML service capabilities to other nodes including the network entity 105, without a request. For the cross-node ML configuration, the network entity 105 may determine that the UE 115 may enable cross-node ML service based on capability information from the UE 115 and the ML service, and the network entity 105 may request and obtain the configuration from the ML service to provide to the UE 115. For cross-node ML inference, the UE 115 may send ML service input data to the network entity 105 to forward to the ML service, and the ML service may provide an ML service data response or output data (e.g., input/output data flow between the UE 115 and the ML service via the network entity 105). For performance monitoring, the UE 115, the network entity 105, and/or the ML service may monitor performance (e.g., by monitoring respective key performance indicator and associated thresholds). In some examples, the UE 115 and/or the network entity 105 may transmit monitoring reports to the ML service. The monitored conditions may cause the UE 115 to activate, deactivate, or switch (e.g., new or default configuration) one or more ML configurations, for example, to optimize the wireless communication system 100 to operate as expected (e.g., above a system or model performance threshold).

Figure 2:
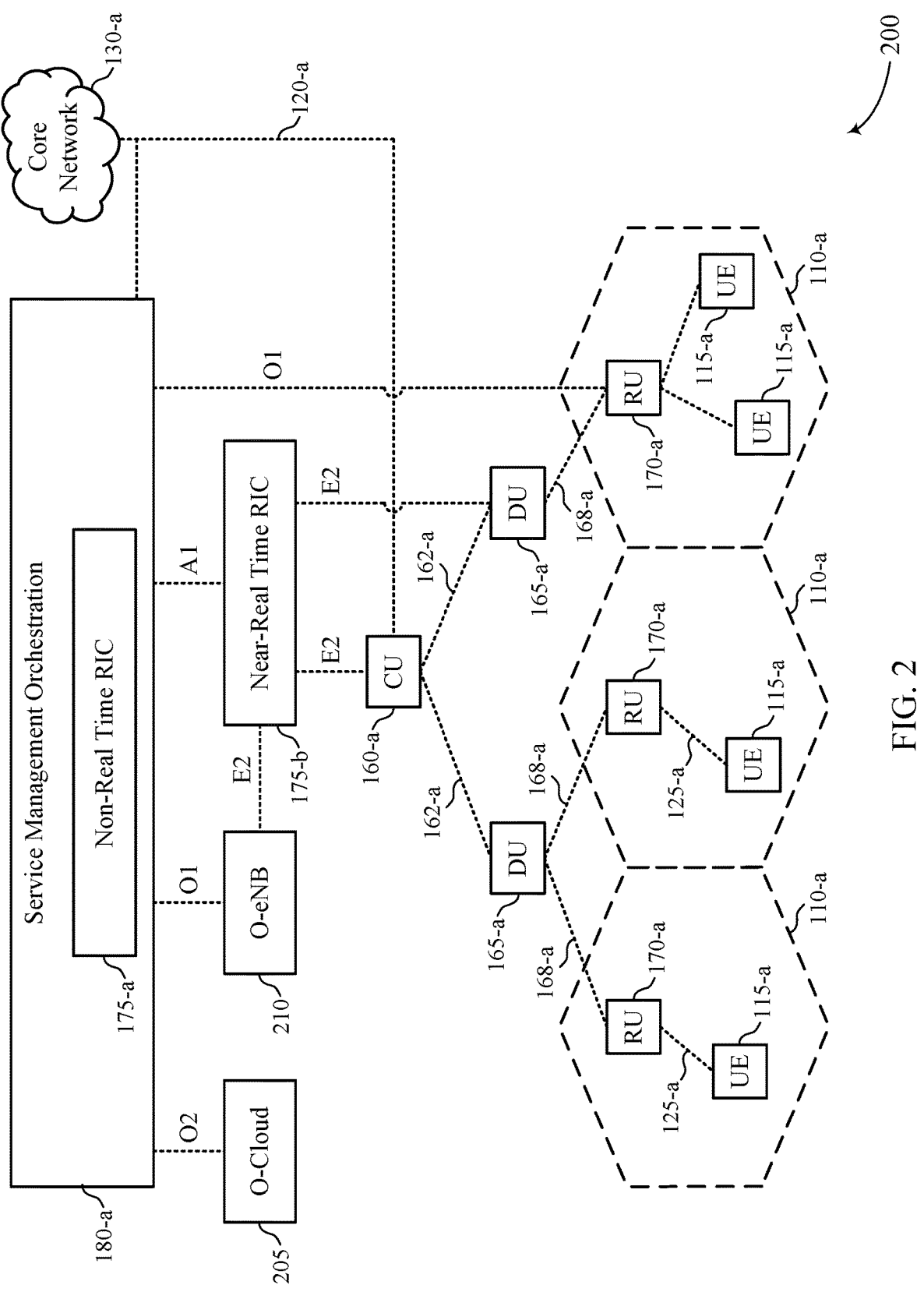
FIG. 2 shows an example of a network architecture that supports cross-node AI/ML services in accordance with one or more aspects of the present disclosure.

FIG. 2 shows an example of a network architecture 200 (e.g., a disaggregated base station architecture, a disaggregated RAN architecture) that supports cross-node AI/ML services in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 may include, but are not limited to, CUs 160-*a*, DUs 165-*a*. RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

As described herein, a UE 115-*a* may communicate its ML capabilities (e.g., AI/ML capabilities) to a network entity (e.g., via one or more RUs 170-*a*, via one or more DUs 165-*a*, via one or more CUs 160-*a*, or the like), and an AI/ML service (e.g., AI/ML service) may provide AI/ML service capabilities to the network entity. The network entity may facilitate cross-node configuration, cross-node AI/ML inference, and/or performance monitoring based on the AI/ML capabilities of the UE 115-*a* and the AI/ML service capabilities of the AI/ML service. By relaying the information between the UE 115-*a* and the AI/ML service, the UE 115-*a* may indirectly communicate with the AI/ML service so that the UE 115-*a* may be updated with ML models that facilitate the UE 115-*a* in performing as expected (e.g., above a performance threshold) and as compatible with the AI/ML service.

To exchange capabilities with the AI/ML service, the network entity may request AI/ML service capabilities from the AI/ML service after receiving the capabilities from the UE 115-*a*, and the AI/ML service may provide the AI/ML service capabilities to the network entity in response to the request. In some examples, the AI/ML service may announce the AI/ML service capabilities to other nodes including the network entity (e.g., without a request). For the cross-node AI/ML configuration, the network entity may determine that the UE 115-*a* may enable cross-node ML service based on capability information from the UE 115-*a* and the AI/ML service, and the network entity may request and obtain the configuration from the AI/ML service to provide to the UE 115. For cross-node AI/ML inference, the UE 115 may send AI/ML service input data to the network entity to forward to the AI/ML service, and the AI/ML service may provide an AI/ML service data response or output data (e.g., input/output data flow between the UE 115 and the AI/ML service via the network entity 105). For performance monitoring, the UE 115, the network entity 105, and/or the AI/ML service may monitor performance (e.g., by monitoring respective key performance indicator and associated thresholds). In some examples, the UE 115-*a* and/or the network entity may transmit monitoring reports to the AI/ML service. The monitored conditions may cause the UE 115-*a* to activate, deactivate, or switch (e.g., new or default configuration) one or more AI/ML configurations, for example, to optimize wireless communication systems to operate as expected (e.g., above a system or model performance threshold).

Figure 3:
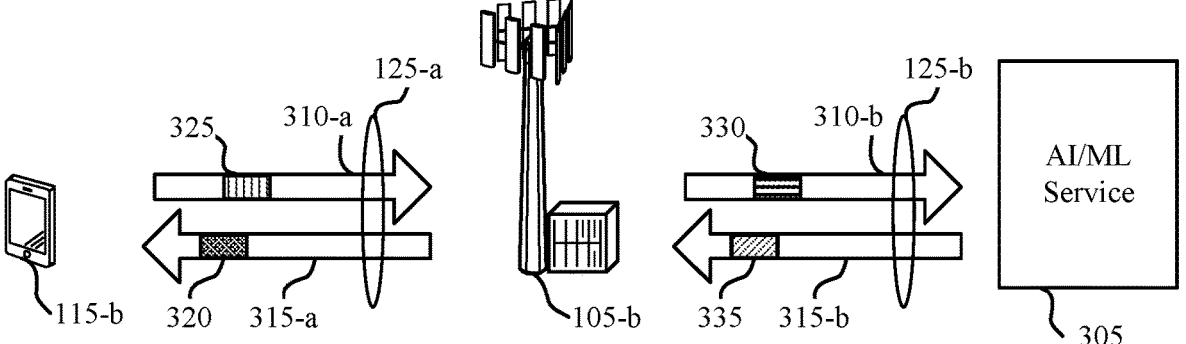
FIG. 3 shows an example of a wireless communications system that supports cross-node AI/ML services in accordance with one or more aspects of the present disclosure.

FIG. 3 shows an example of a wireless communications system 300 that supports cross-node AI/ML services in accordance with one or more aspects of the present disclosure. The wireless communications system 300 may implement aspects of or may be implemented by aspects of the wireless communications system 100. For example, the wireless communications system 300 includes a UE 115-*b*, which may be an example of a UE 115 described with respect to FIG. 1. The wireless communications system 300 also includes a network entity 105-*b*, which may be an example of a network entity 105 as described with respect to FIG. 1.

The wireless communications system 300 may a UE 115 (e.g., UE 115-*b*), a network entity 105 (e.g., 105-*b*, RAN), and a ML service 305 (e.g., AI/ML service) that support ML operations or models (e.g., AI/ML operations or models). The ML operations or models may enable the respective device with a ML functionality to optimize the wireless communications system 300, for example, by predicting traffic patterns and adjusting the network accordingly to reduce network congestion and to optimize use of system resources. In such wireless communications system 300, the UE 115 and the network entity 105 may involve one or more paired or two-sided AI/ML models and joint inference between the UE 115 and the network entity 105. As used herein, "inference" may refer to an output or prediction based on applying one or more AI/ML models to input data (e.g., current data associated with the wireless communications system 300). Accordingly, the joint inference may be performed using the paired AI/ML models, where AI/ML inference is performed jointly across the UE 115 and the network entity 105. For example, the UE 115 may perform the first part of the joint inference and then network entity 105 may perform then the remaining part of the joint inference, or vice versa. The UE 115 may receive AI/ML-specific control information or input from network entity 105 (e.g., in addition to existing signaling from the network entity 105), or vice versa.

The network entity 105 (e.g., network entity 105-*b*) may communicate with the UE 115 (e.g., UE 115-*b*) using a communication link 125 (e.g., communication link 125-*a*). The communication link 125 may be an example of an NR or LTE link between the UE 115 and the network entity 105. The communication link 125 may include a bi-directional link that enables both uplink and downlink communications. For example, the UE 115-*a* may transmit uplink signals 310 (e.g., uplink signals 310-*a*, uplink transmissions), such as uplink control signals or uplink data signals, to the network entity 105-*b* using the communication link 125 and the network entity 105-*b* may transmit downlink signals 315 (e.g., downlink signals 315-*a*, downlink transmissions), such as downlink control signals or downlink data signals, to the UE 115 using the communication link 125.

The network entity 105 (e.g., network entity 105-*b*) may communicate with the ML service 305 using a communication link 125 (e.g., communication link 125-*b*). The communication link 125 may be an example of an NR or LTE link between the ML service 305 and the network entity 105. The communication link 125 may include a bi-directional link that enables both uplink and downlink communications. For example, the network entity 105 may transmit uplink signals 310 (e.g., uplink signals 310-*b*, uplink transmissions), such as uplink control signals or uplink data signals, to the ML service 305 using the communication link 125 and the ML service 305 may transmit downlink signals 315 (e.g., downlink signals 315-*b*, downlink transmissions), such as downlink control signals or downlink data signals, to the network entity 105 using the communication link 125.

In some examples, as discussed herein, the UE 115 may be unable to discover or directly communicate with the ML service 105. In such examples, the network entity 105 may output or transmit a control message (e.g., control signal) 320 to the UE 115 over the communication link 125-*a*, in which the control message 320 indicates one or more ML configurations for the UE 115 to perform ML procedures. The UE 115 may output a message 325 to the network entity 105 over the communication link 125-*a* that indicates AI/ML input data from the UE 115, such as one or more model inference results at the UE 115. The model inference results from the UE 115 may be used by the ML service 305. The network entity 105 may forward the AI/ML input data in a message 330 to the ML service 305 over the communication link 125-*b*. The ML service 305 may use the input data from the UE 115 to generate output data (e.g., used the one or more model inference results from the UE 115). For example, the ML service 305 may output a message 335 to the network entity 105 over the communication link 125-*b*, in which the message 335 includes AI/ML output data.

In accordance with the techniques described herein, the UE 115-*b*, the network entity 105-*b*, and the ML service 305 may perform respective capability exchange procedures, cross-node AI/ML configuration procedures, cross-node AI/ML inference procedures, and monitoring and LCM operations. LCM may refer to the use of AI and/or ML for operations that maintain one or more wireless communication links, such as CSI reporting (e.g., CSI prediction), beam management operations (e.g., spatial and temporal beam prediction), positioning (e.g., AI and/or ML-assisted positioning), among other examples. As an example, the capability exchange procedures may include the ML service 305 providing AI/ML service capability information to the network entity 105-*b* and the UE 115-*b* providing AI/ML capability information to network entity 105-*b*. The cross-node AI/ML configuration procedure may include the configuration of AI/ML functions for the UE based on the UE and AI/ML service capabilities, and the cross-node AI/ML inference procedure may include the exchange of AI/ML input data (e.g., encoder output) from the UE 115-*b* to the network entity 105-*b*, as well as AI/ML output data (e.g., decoder output) from the ML service 305 to the network entity 105-*b*. The monitoring and LCM procedures may include monitoring by the UE 115-*b*, the network entity 105-*b*, and/or the ML service 305, where LCM procedures may be performed based on the monitoring output, which may include activation, deactivation, fallback, switching, or any combination thereof, of AI/ML functions at the UE 115-*b* and/or the ML service 305. For example, the network entity 105-*b* (e.g., the RAN) along with the AI/ML service 305 may control activation or deactivation of the one or more AI/ML configurations for the UE 115-*b*.

Figure 4:
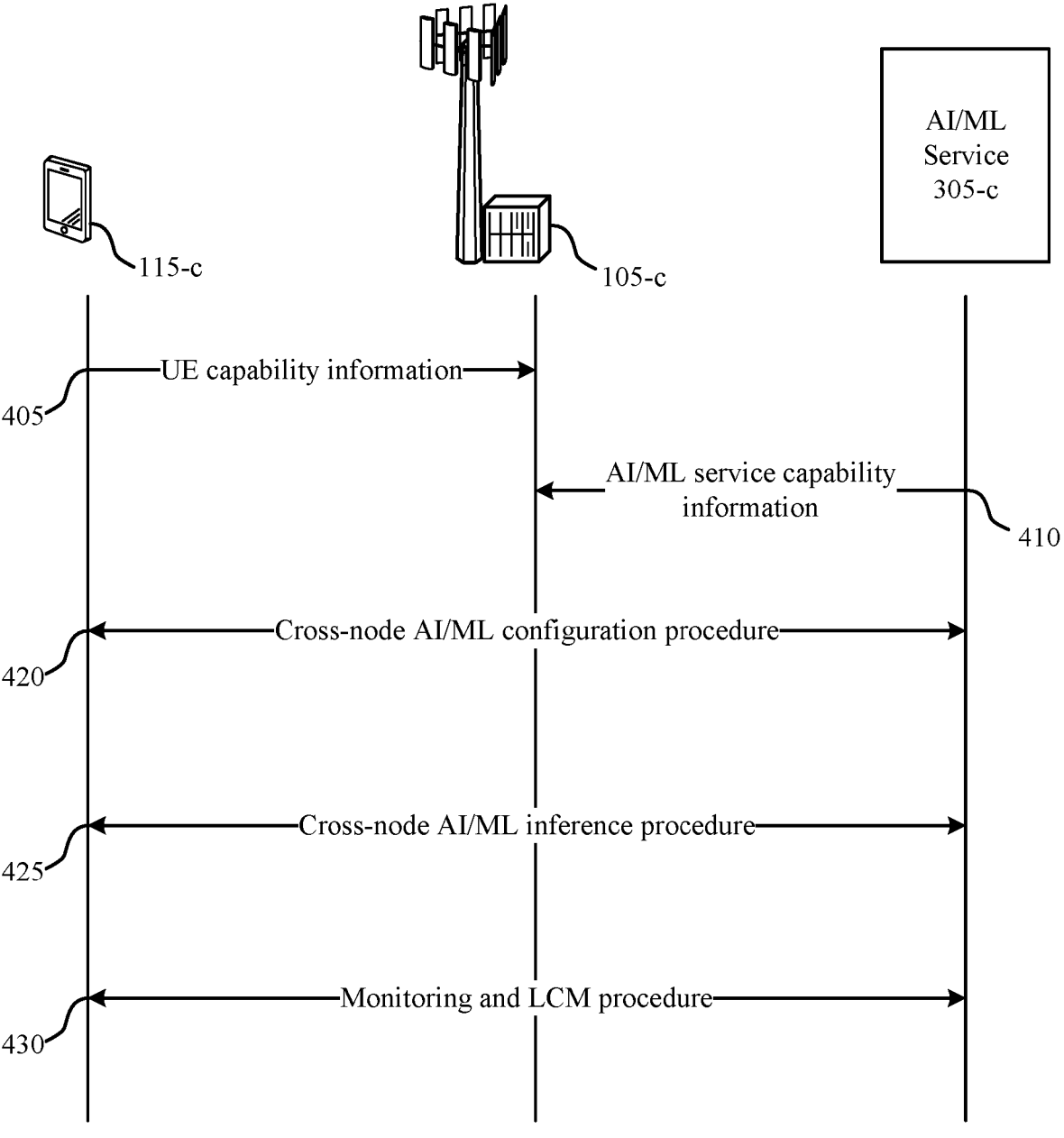
FIGS. 4 through 10 show examples of process flows that support cross-node AI/ML services in accordance with one or more aspects of the present disclosure.

FIG. 4 shows an example of a process flow 400 that supports cross-node AI/ML services in accordance with one or more aspects of the present disclosure. The process flow 400 may implement aspects of or may be implemented by aspects of the wireless communications systems 100 and 300. For example, the process flow 400 may include a UE 115-*c*, which may be an example of a UE 115 as described herein. The process flow 400 may include a network entity 105-*c*, which may be an example of a network entity 105 as described herein. The process flow 400 may include an ML service 305-*c*, which may be an example of an ML service 305 as described herein. In the following description of the process flow 400, the operations performed by the network entity 105-*c*, the UE 115-*c*, and the ML service 305-*c* may be performed in different orders or at different times than the exemplary order shown. Some operations may also be omitted from the process flow 400, or other operations may be added to the process flow 400. Further, while operations in the process flow 400 are illustrated as being performed by the network entity 105-*c*, the UE 115-*c*, and the ML service 305-*c*, the examples herein are not to be construed as limiting, as the described features may be associated with any quantity of different devices.

The process flow 400 may illustrate cross-node AI/ML inference services, in which at least some inference services are provided via cross-node (e.g., relayed, handover, across, or indirectly). For example, at 405, the UE 115-*c* may transmit UE capability information to the network entity 105-*c* (e.g., RAN) and at 410, the ML service 305-*c* (e.g., AI/ML service) may output service capability to the network entity 105. The network entity 105-*c* may facilitate in exchanging capability information or otherwise providing capability information across nodes (e.g., a UE node and an ML service node). Exchanging the capability information may facilitate cross-node configuration. Accordingly, at 420, a cross-node configuration procedure may be performed. The cross-node configuration procedure may be performed as discussed with respect to FIG. 6. For example, the procedure may involve multiple nodes, such as the UE 115, the network entity 105, and the ML service 305-*c*, and information may be relayed across the multiple nodes to configure the UE 115-*c* with one or more ML configurations. The configurations may be based on the UE capabilities and the AI/ML service capabilities.

At 425, a cross-node AI/ML inference procedure may be performed. The cross-node AI/ML inference procedure may be performed as discussed with respect to FIG. 7. For example, the procedure may involve multiple nodes, such as the UE 115, the network entity 105, and the ML service 305-*c*, and information may be relayed across the multiple nodes to exchange inference between the UE 115-*c* and the ML service 305-*c*. The cross-node AI/ML inference procedure may include cross-node AI/ML input data (e.g., encoder output) from the UE 115-*c* to the network entity 105, and AI/ML output data (e.g., decoder output) from the ML service 305-*c* to the network entity 105.

At 430, a cross-node monitoring procedure may be performed. The cross-node monitoring procedure may be performed as discussed with respect to FIGS. 8, 9, and 10. For example, the procedure may involve multiple nodes, such as the UE 115, the network entity 105, and the ML service 305-*c*, and information may be relayed across the multiple nodes to exchange monitored information between the UE 115, the network entity 105, and the ML service 305-*c*. The monitoring procedure may include a monitoring and LCM procedure, in which monitoring occurs at the UE 115, the network entity 105, or the ML service 305-*c*. The LCM may be based on monitor output from the UE 115, the network entity 105, or the ML service 305-*c*. The monitoring may cause one or more ML configurations to be activated, deactivated, or switched (e.g., to a default ML configuration or another one or more ML configurations), for example, via the network entity 105 (e.g., the RAN) in combination with the ML service 305-*c*.

Figure 5:
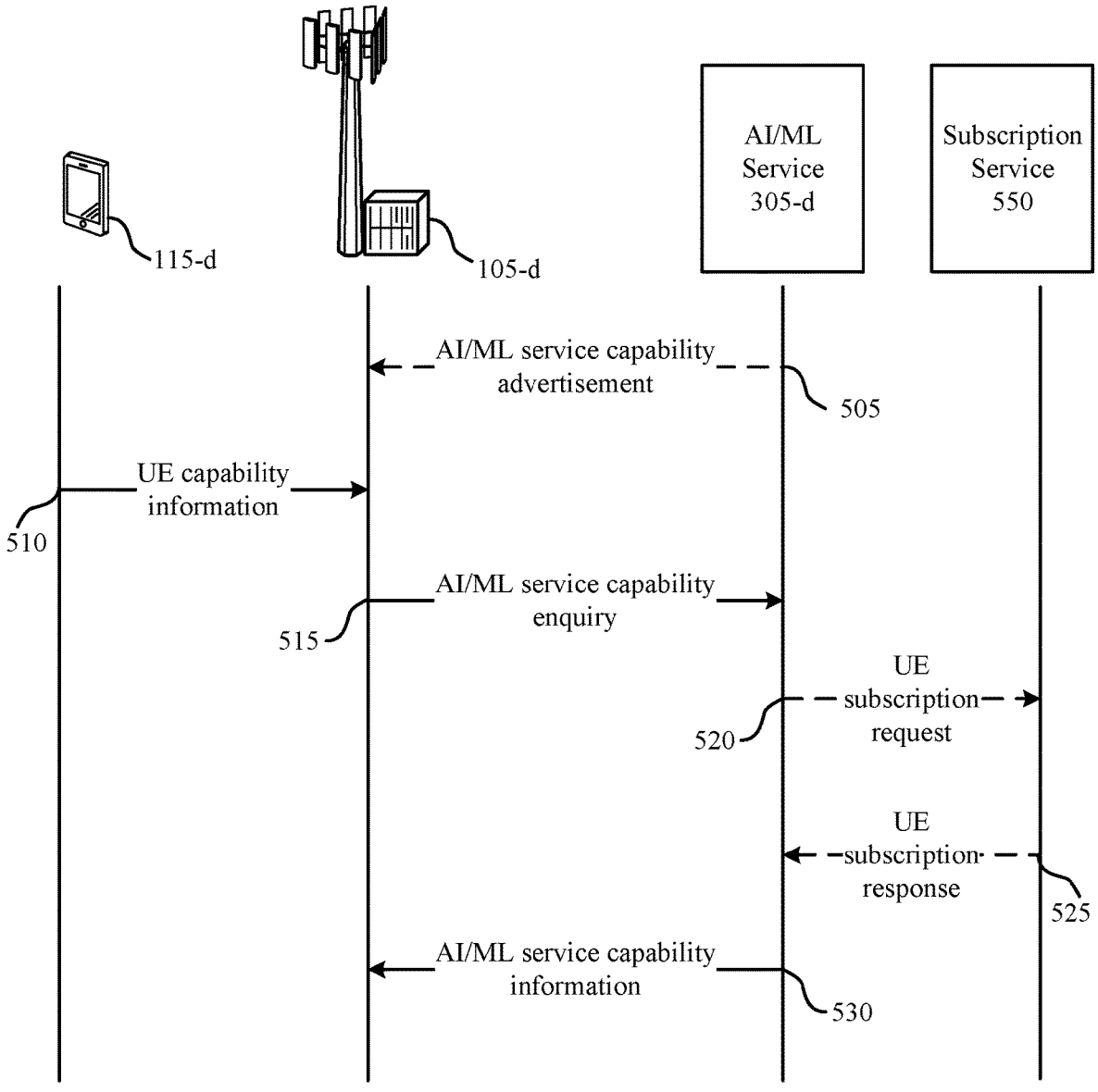

FIG. 5 shows an example of a process flow 500 that supports cross-node AI/ML services in accordance with one or more aspects of the present disclosure. The process flow 500 may implement aspects of or may be implemented by aspects of the wireless communications systems 100 and 300. For example, the process flow 500 may include a UE 115-*d*, which may be an example of a UE 115 as described herein. The process flow 500 may include a network entity 105-*d*, which may be an example of a network entity 105 as described herein. The process flow 500 may include an AI/ML service 305-*d*, which may be an example of an ML service 305 as described herein. In the following description of the process flow 500, the operations performed by the network entity 105-*d*, the UE 115-*d*, and the ML service 305-*d* may be performed in different orders or at different times than the exemplary order shown. Some operations may also be omitted from the process flow 500, or other operations may be added to the process flow 500. Further, while operations in the process flow 500 are illustrated as being performed by the network entity 105-*d*, the UE 115-*d*, and the ML service 305-*d*, the examples herein are not to be construed as limiting, as the described features may be associated with any quantity of different devices.

The process flow 500 may illustrate capability exchange procedures, in which at least some capabilities are exchanged via cross-node (e.g., relayed, handover, across, or indirectly). In some examples, at 505, the ML service 305-*d* may output an AI/ML service capability advertisement to facilitate an AI/ML service capability exchange between the AI/ML service 305-*d* and the network entity 105-*d*. For example, the ML service 305-*d* may advertise AI/ML service capabilities to network entity 105-*d*, such as a list of supported function. The advertisement may also include a list of supported AI/ML models per function, feature, or feature group, as well as include an area configuration of AI/ML service, functions, or models.

At 510, the UE 115-*d* may output UE capability information to the network entity 105, as discussed with respect to 405 of FIG. 4. At 515, the network entity 105-*d* may output an AI/ML service capability enquiry, in which the network entity 105-*d* may query the ML service 305-*d* for the AI/ML service capabilities. Because the network entity 105-*d* received the UE capability information from the UE 115-*d*, the network entity 105-*d* may include a set of UE identities (e.g., multiple UE identities) including the UE identity along with the UE capability information to the ML service 305-*d*. In some examples, at 520, the ML service 305-*d* may output a UE subscription request to a subscription service 550 based on the information received from the network entity 105-*d*, such as the UE identity (e.g., the set of UE identities). At 525, the subscription service 550 may output a UE subscription response 525 based on the UE subscription request. For example, the subscription service 550 may provide one or more ML configurations corresponding to one or more ML models based on the UE identity. In some examples, upon receiving the AI/ML service capability request, the ML service 305-*d* may validate the UE subscription information and policies from the subscription service 550 to determine whether ML services, such as models, are allowed for the UE 115. The ML service 305-*d* may reject the AI/ML service capability enquiry, for example, based on the UE identity. At 530, the ML service 305-*d* may output the AI/ML service capability information, as discussed with respect to 410 of FIG. 4.

Figure 6:
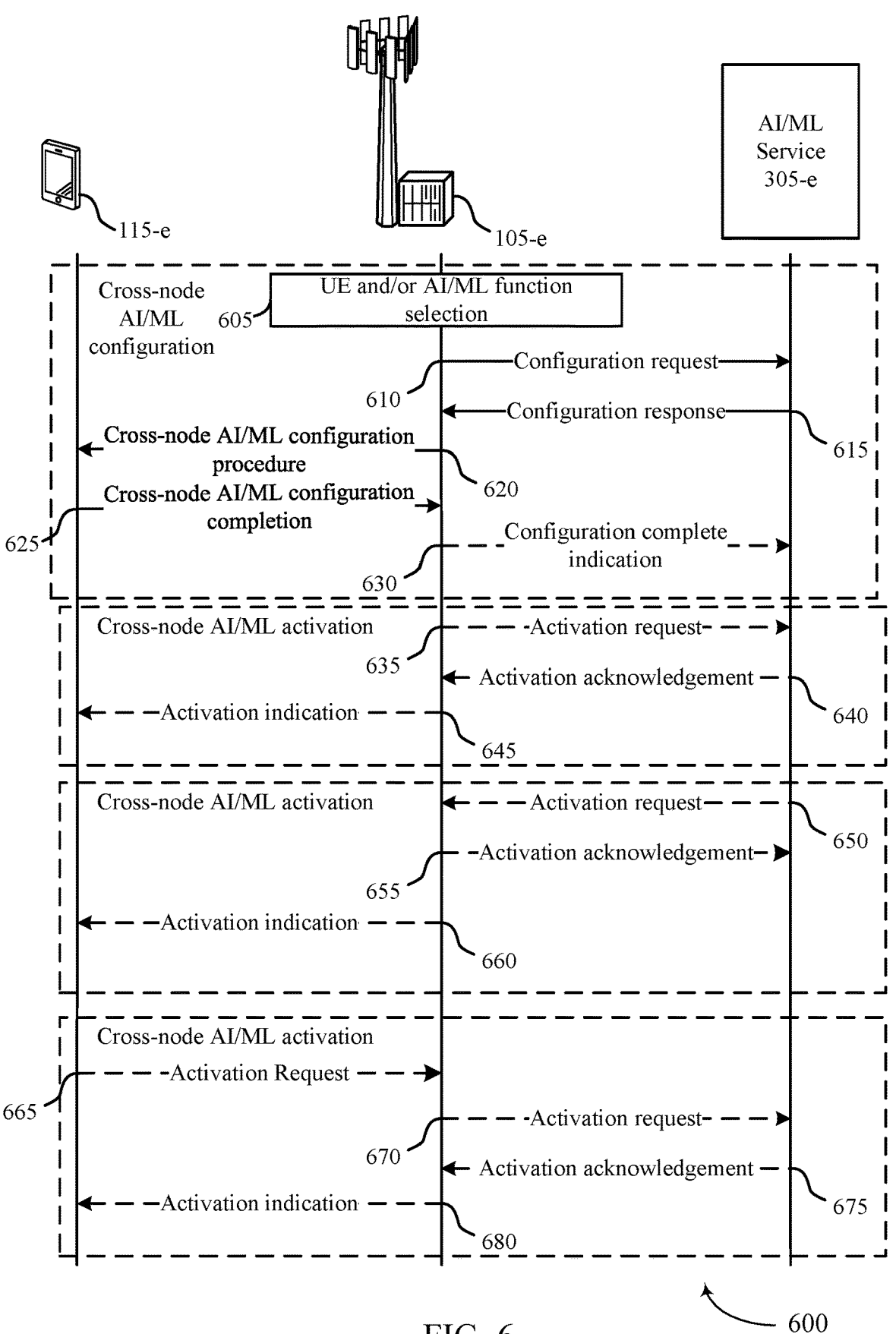

FIG. 6 shows an example of a process flow 600 that supports cross-node AI/ML services in accordance with one or more aspects of the present disclosure. The process flow 600 may implement aspects of or may be implemented by aspects of the wireless communications systems 100 and 300. For example, the process flow 600 may include a UE 115-*e*, which may be an example of a UE 115 as described herein. The process flow 600 may include a network entity 105-*e*, which may be an example of a network entity 105 as described herein. The process flow 600 may include an ML service 305-*e*, which may be an example of an ML service 305 as described herein. In the following description of the process flow 600, the operations performed by the network entity 105-*e*, the UE 115-*e*, and the ML service 305-*e* may be performed in different orders or at different times than the exemplary order shown. Some operations may also be omitted from the process flow 600, or other operations may be added to the process flow 600. Further, while operations in the process flow 600 are illustrated as being performed by the network entity 105-*e*, the UE 115-*e*, and the ML service 305-*e*, the examples herein are not to be construed as limiting, as the described features may be associated with any quantity of different devices.

The process flow 600 may provide cross-node AI/ML configuration, in which at least some ML configurations are provided via cross-node (e.g., relayed, handover, across, or indirectly). The cross-node AI/ML configuration between the network entity 105-*e* and the UE 115-*e* may be based on the AI/ML service inputs, as discussed with respect to FIG. 4. For example, the at 605, the network entity 105-*e* (e.g., RAN) may determine that the UE 115-*e* may enable cross-node AI/ML configuration, such that the network entity 105-*e* may select ML functions for the UE 115-*e* or the ML service 305-*e*. The network entity 105-*e* may determine that the UE 115-*e* may enable the cross-node AI/ML configuration based on the UE capability information and the ML service capability information, as discussed with respect to FIG. 5.

At 610, after making the determination for cross-node AI/ML configuration, the network entity 105-*e* may output a request message for a configuration request to the ML service 305-*e*. The request may include a request for ML configuration information from the ML service 305-*e*. For example, the network entity 105-*e* may include the UE identity or the selected ML functions (e.g., ML models) for configuration in the configuration request. At 615, the ML service 305-*e* may output AI/ML input and output data configuration in a configuration response message. The configuration response may include one or more ML configurations, preferred one or more configurations (e.g., a default configuration), triggers or periodicity associated with the ML configurations. The ML service 305-*e* may also provide a monitoring configuration in a monitoring configuration message. The monitoring configuration may indicate monitoring events, monitoring key performance indicators (KPIs) configuration, thresholds, monitoring report configuration, or other monitoring-related configuration.

At 620, the network entity 105-*e* may output message to the UE 115-*e* for a cross-node AI/ML procedure. For example, network entity 105-*e* may output one or more messages with one or more ML configurations to the UE 115-*e* from the configuration response. The procedure may involve relaying the one or more ML configurations to the UE 115-*e* individually or as a collectively. Once the procedure is complete, at 625, UE 115-*e* may output a completion message for a cross-node AI/ML configuration completion, indicating that the UE 115-*e* has completed the cross-node AI/ML configuration procedure. For example, completing the procedure may result in the UE 115-*e* being configured with the one or more ML configurations and using the one or more corresponding ML models. After the configuration, the one or more ML configurations may be activated. The network entity 105-*e* may activate the AI/ML service. In some examples, the activation may be requested by the UE 115-*e* or the ML service 305-*e*. In some cases, at 630, the network entity 105-*e* may output a message, to the ML service 305-*e*, including an indication that the AI/ML configuration is complete (e.g., at the UE 115-*e*).

In examples where the network entity 105-*e* requests activation, at 635, the network entity 105-*e* may output an activation request message to the ML service 305-*e* to request activating the configurations. The request may include the UE identity or ML functions (e.g., models), as determined at 610. At 640, the ML service 305-*e* may acknowledge the request by outputting an activation acknowledgement message. The acknowledgement may include the UE identity and the ML functions. At 645, the network entity 105-*e* may output an activation indication message to the UE 115-*e* to indicate to the UE 115-*e* to activate the one or more ML configurations that the UE 115-*e* received. The activation indication may also indicate to the UE 115-*e* to activate cross-node AI/ML inference.

In examples where the ML service 305-*e* requests activation, at 650, the ML service 305-*e* may output the activation request message to the network entity 105-*e* to request activating the configurations. At 655, the network entity 105-*e* may output the activation acknowledgement message to acknowledge activation of the one or more ML configurations at the UE 115-*e* or to activate the configured AI/ML inference at the UE (e.g., cross-node AI/ML inference activation by the ML service 305-*e*). Accordingly, at 660, the network entity 105-*e* may output the activation indications 660 to indicate to the UE to activate the one or more ML configurations.

In examples where the UE 115-*e* requests activation, at 665, the UE 115-*e* may transmit the activation request message to the network entity 105-*e* to request activating the configurations. For example, after the configuration completion, the UE 115-*e* may send the activation request to the network entity 105-*e* using a UE Assistance Information (UAI), a medium access control (MAC) Control Element (MAC CE), or the like. The network entity 105-*e* may activate cross-node AI/ML inference operation upon request from the UE 115. For example, at 670, the network entity 105-*e* may forward the request to the ML service 305-*e*. Accordingly, at 675, the ML service 305-*e* may output the activation acknowledgment message to the network entity 105. At 680, the network entity 105-*e* may output the activation indication message to indicate to the UE to activate the one or more ML configurations or the ML inference at the UE 115.

Figure 7:
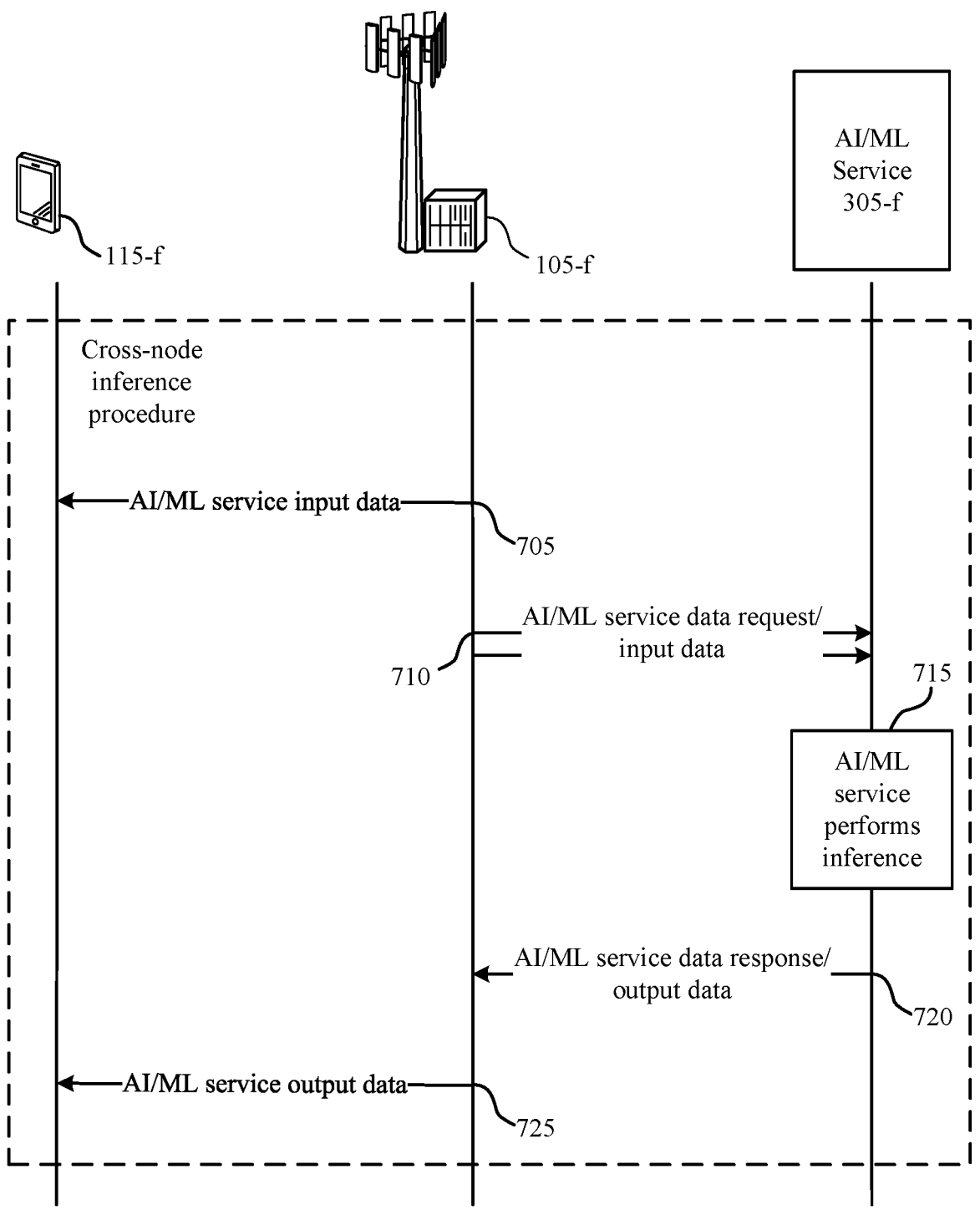

FIG. 7 shows an example of a process flow 700 that supports cross-node AI/ML services in accordance with one or more aspects of the present disclosure. The process flow 700 may implement aspects of or may be implemented by aspects of the wireless communications systems 100 and 300. For example, the process flow 700 may include a UE 115-*f*, which may be an example of a UE 115 as described herein. The process flow 700 may include a network entity 105-*f*, which may be an example of a network entity 105 as described herein. The process flow 700 may include an ML service 305-*f*, which may be an example of an ML service 305 as described herein. In the following description of the process flow 700, the operations performed by the network entity 105-*f*, the UE 115-*f*, and the ML service 305-*f* may be performed in different orders or at different times than the exemplary order shown. Some operations may also be omitted from the process flow 700, or other operations may be added to the process flow 700. Further, while operations in the process flow 700 are illustrated as being performed by the network entity 105-*f*, the UE 115-*f*, and the ML service 305-*f*, the examples herein are not to be construed as limiting, as the described features may be associated with any quantity of different devices.

The process flow 700 may provide a process for a cross-node AI/ML inference procedure, in which at least some ML inferences are provided via cross-node (e.g., relayed, handover, across, or indirectly). The cross-node AI/ML inference procedure may be based on AI/ML input data and output data flow between the UE 115-*f* and the ML service 305-*f* via the network entity 105.

At 705, the UE 115-*f* may output an inference message with the AI/ML service input data (e.g., UE model's inference result) to the network entity 105. The inference result from the UE may be used as input to the corresponding service models at the ML service 305-*f*. For example, the inference input data from the UE 115-*f* may be used as input to decoder models for channel state information (CSI) feedback for the ML service 305-*f*. At 710, the network entity 105-*f* may output a request message for the AI/ML service data request or input data to the ML service 305-*f* to forward the AI/ML service input data to the ML service 305-*f*. At 715, the ML service 305-*f* performs inference using the input data (e.g., UE inference results) in order to generate output data or the service data response. Accordingly, at 720, the ML service 305-*f* may output a response message for AI/ML service data response or output data to the network entity 105. In some examples, the ML inference from the ML service 305-*f* may be forwarded to the UE 115-*f* via the network entity 105. Some services may involve a bounded response time to meet latency limitations, such as based on forwarding data via cross-nodes (e.g., the ML service 305-*f* to the network entity 105, and the network entity 105-*f* to the UE 115). The bounded response time may limit whether certain cross-node AI/ML features may be deployed as a separate service. At 725, the network entity 105-*f* may output, and the UE 115-*f* may receive, AI/ML service output data (e.g., received from the ML service 305-*f*).

Figure 8:
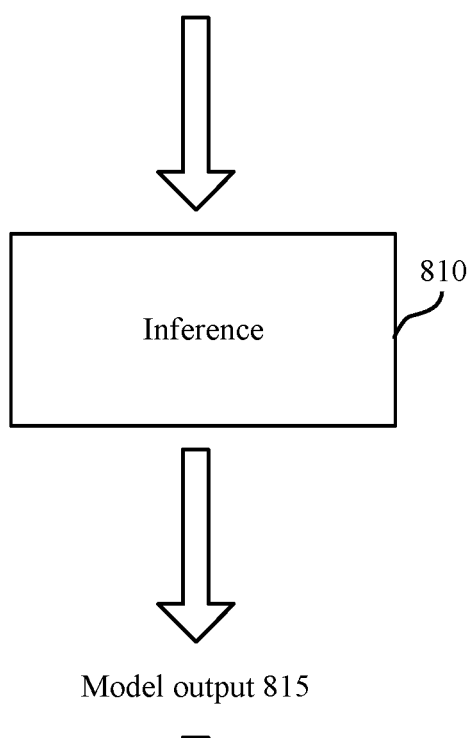
Figure 8:
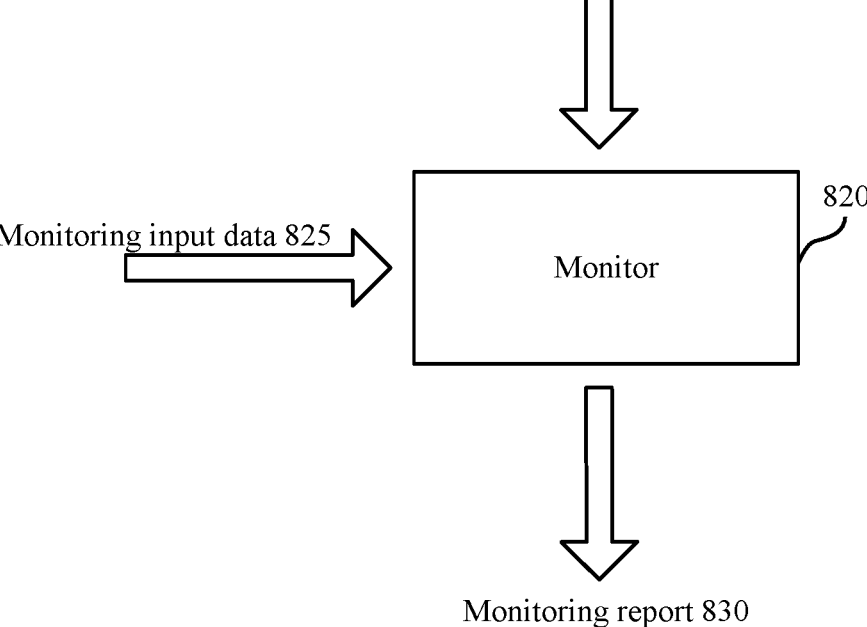

FIG. 8 shows an example of a process flow 800 that supports cross-node AI/ML services in accordance with one or more aspects of the present disclosure. The process flow 800 may implement aspects of or may be implemented by aspects of the wireless communications systems 100 or 300. For example, the process flow 800 may be implemented by a UE 115, a network entity 105, or an ML service 305, that may be examples of a UE 115, a network entity 105, and an ML service 305, as described herein. In the following description of the process flow 800, the operations performed may be performed in different orders or at different times than the exemplary order shown. Some operations may also be omitted from the process flow 800, or other operations may be added to the process flow 800. Further, while operations in the process flow 800 are illustrated as being performed by the UE 115, the network entity 105, or the ML service 305, the examples herein are not to be construed as limiting, as the described features may be associated with any quantity of different devices.

The process flow 800 may provide monitoring and reporting, in which at least some monitoring and reporting services are provided via cross-node (e.g., relayed, handover, across, or indirectly). Monitoring input data and reporting may result in the UE 115 switching or deactivating a current one or more AI/ML models for which the UE 115 is configured. As discussed herein, the process flow 800 may be performed by the UE 115, the network entity 105, and/or the ML service 305. Monitoring may involve AI/ML input data 805 that is used as in input for AI/ML inference 810, in which data is applied to one or more ML models. The inference data may be model output 815, which may be used as an input to monitor 820.

Monitoring may trigger model switching or deactivation, for example, when a model or system performance degrades below a threshold. Performance may be determined based on a monitor report, such as a UE monitor report from a UE 115 or a network entity monitoring report from the network entity 105. In such examples, the model usage scenario may change, such as system setting changes (e.g., quantity of antennas, carriers in use, and the like), location or environment changes (e.g., indoor versus outdoor), service changes (e.g., network slice, quality of service (QOS) flow, session, and the like).

Monitoring input data 825 may be an input to monitor 820, and the monitoring input data 825 may be used for evaluating performance of the wireless communications system. For example, a device that monitors may output a monitoring report 830 using the monitoring input data 825. A monitoring report 830 may be an output from a device (e.g., the UE 115) that is to monitor 820. The monitoring report may include AI/ML service KPIs. The KPIs may be used to track inference performance (e.g., UE inference or ML service inference) with respect to ground truth (e.g., target for training or validating a model with a dataset). For example, the monitoring report may indicate a minimum mean square error (MMSE) threshold compared to ground truth, inference latency, and the like.

The monitoring report 830 (feedback KPIs) may include AI/ML Service KPIs (e.g., of the ML service 305 or the UE 115) or system KPIs, which may be used to track overall system performance when AI/ML inference is in operation computed at UE 115 and network entity 105. For example, system KPIs may be used to track network loading, uplink and downlink throughput, delay, packet loss, radio link failure (RLF) rates, and so forth, that indicate system performance. The monitoring report 830 may include feedback KPIs with event-based feedback. For example, the feedback KPIs may be based on configured events such as performance KPI below a threshold. In some examples, the feedback may provide periodically, such as periodic feedback with a configured periodicity.

Figure 9:
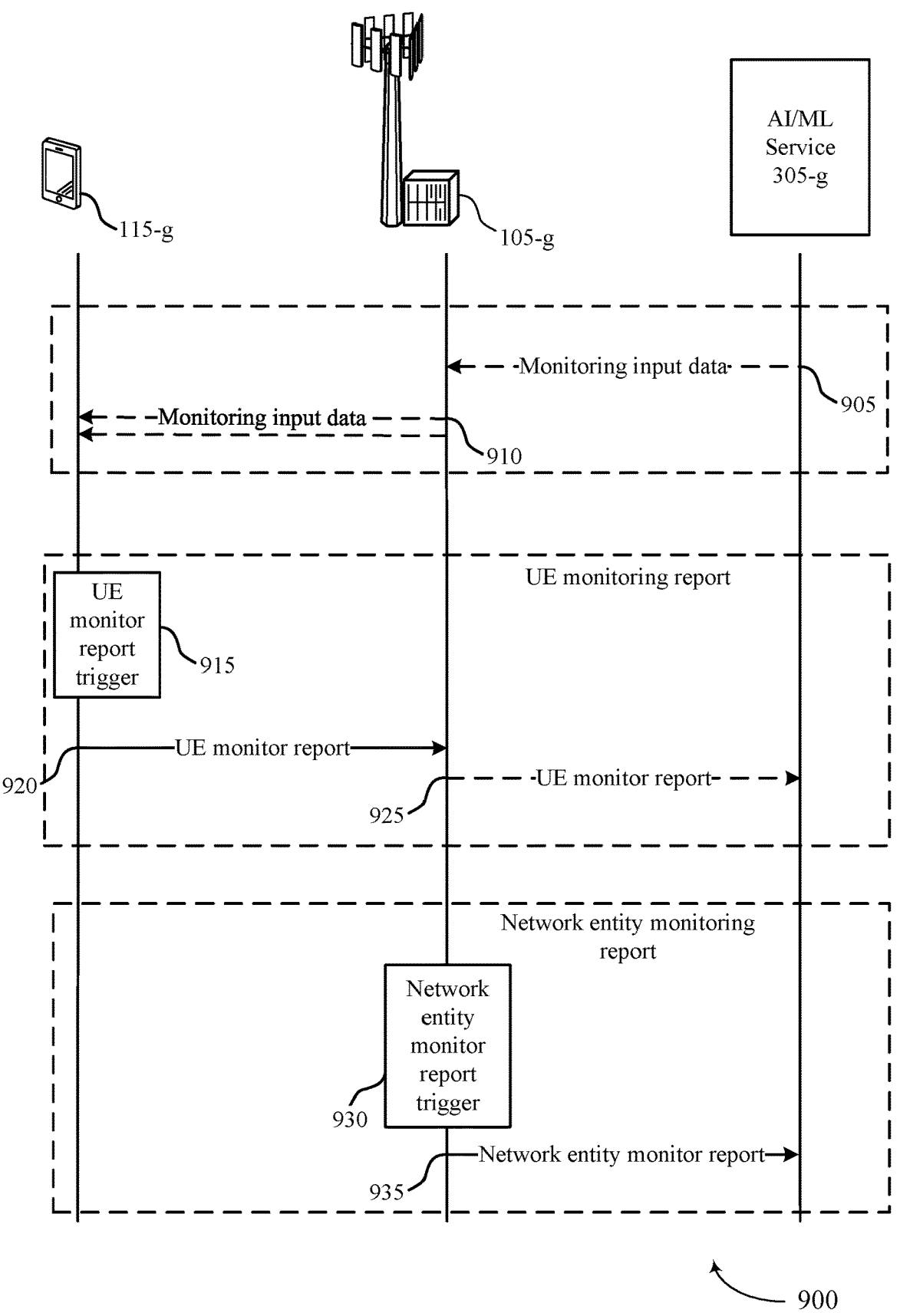

FIG. 9 shows an example of a process flow 900 that supports cross-node AI/ML services in accordance with one or more aspects of the present disclosure. The process flow 900 may implement aspects of or may be implemented by aspects of the wireless communications systems 100 and 300. For example, the process flow 900 may include a UE 115-g, which may be an example of a UE 115 as described herein. The process flow 900 may include a network entity 105-g, which may be an example of a network entity 105 as described herein. The process flow 900 may include an ML service 305-g, which may be an example of an ML service 305-g as described herein. In the following description of the process flow 900, the operations performed by the network entity 105-g, the UE 115-g, and the ML service 305-g-g may be performed in different orders or at different times than the exemplary order shown. Some operations may also be omitted from the process flow 900, or other operations may be added to the process flow 900. Further, while operations in the process flow 900 are illustrated as being performed by the network entity 105-g, the UE 115-g, and the ML service 305-g, the examples herein are not to be construed as limiting, as the described features may be associated with any quantity of different devices.

In some examples, performance monitoring may be performed at the UE 115-g or the network entity 105, as shown at 905 and 910 (e.g., monitoring input data from the ML service 305-g sent to the network entity 105-g or from the network entity 105-g to the UE 115-g). The monitoring input data may be transmitted to the UE 115-g via unicast communication or via a broadcast. After receiving the monitoring input data (e.g., from the ML service 305-g), the UE 115-g or the network entity 105-g may perform monitoring and subsequently provide a monitoring report to the ML service 305-g. For example, at 915, the UE 115-g may generate the monitor report based on a trigger (e.g., KPI triggers, system or model performance below a threshold, and so forth). At 920, the UE 115-g may send the monitoring report to the network entity 105, and at 925, the network entity 105-g may send the UE monitor report to the ML service 305-g. In some examples, the monitoring report is sent by UE 115-g or the network entity 105-g upon configured monitoring or reporting conditions occurring. The AI/ML configuration to the UE 115-g or the network entity 105-g may include a list of performance KPIs to monitor and report, where the monitoring events may include thresholds, UE environment, UE or network entity configuration change, and the like. The AI/ML configuration to the UE 115-g or the network entity 105-g may include a list of performance KPIs to report, where reporting configurations include reporting events, report periods, and the like. The configuration may be based on monitoring input data from the ML service 305-g. In some examples, at 930, the network entity 105-g may monitor and report based on a trigger event, and at 935, the network entity 105-g may also send the monitor report to the ML service 305-g. For example, the monitor report may be used for evaluating feedback KPIs or model switching conditions.

Figure 10:
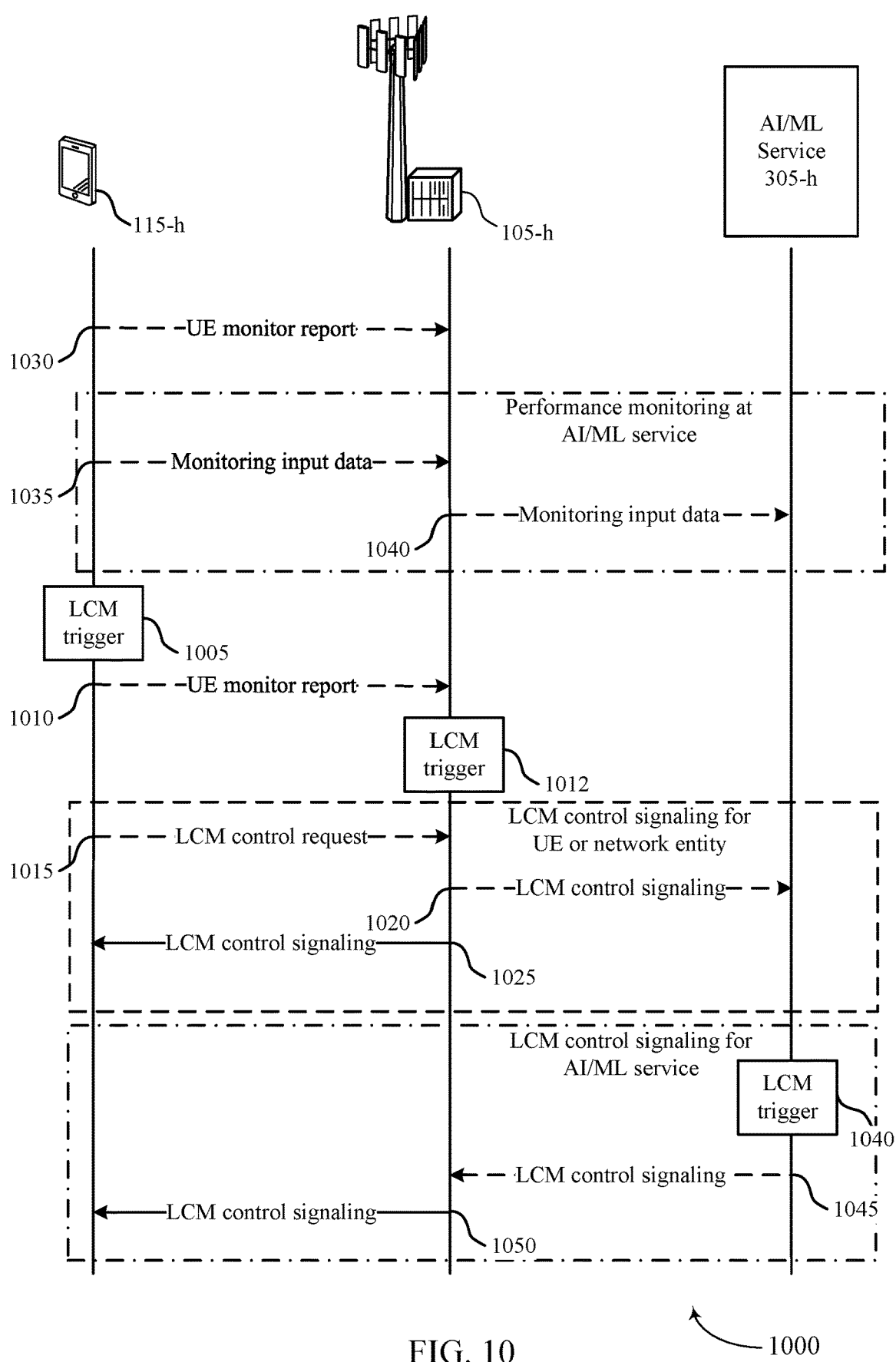

FIG. 10 shows an example of a process flow 1000 that supports cross-node AI/ML services in accordance with one or more aspects of the present disclosure. The process flow 1000 may implement aspects of or may be implemented by aspects of the wireless communications systems 100 and 300. For example, the process flow 1000 may include a UE 115-h, which may be an example of a UE 115 as described herein. The process flow 1000 may include a network entity 105-h, which may be an example of a network entity 105 as described herein. The process flow 1000 may include an ML service 305-h, which may be an example of an ML service 305 as described herein. In the following description of the process flow 1000, the operations performed by the network entity 105-h, the UE 115-h, and the ML service 305-h may be performed in different orders or at different times than the exemplary order shown. Some operations may also be omitted from the process flow 1000, or other operations may be added to the process flow 1000. Further, while operations in the process flow 1000 are illustrated as being performed by the network entity 105-h, the UE 115-h, and the ML service 305-h, the examples herein are not to be construed as limiting, as the described features may be associated with any quantity of different devices.

The process flow 1000 may provide cross-node LCM monitoring, in which at least some of the LCM monitoring is provided via cross-node (e.g., relayed, handover, across, or indirectly). The process flow 1000 may facilitate procedure for UE 115-h or the network entity 105-h to monitor and provide the monitoring report to AI/ML Service for LCM. The performance monitoring may be performed at the UE 115-h or the network entity 105-h. In such examples, the UE 115-h or the network entity 105-h may perform monitoring and provide the monitoring report to ML service 305-h.

For example, at 1005, the UE 115-h may perform the LCM operations based on one or more triggers. The triggers may cause the UE 115-h to generate the LCM monitoring report. At 1010, the UE 115-h may send a monitor report to the network entity 105. In some examples, the UE 115-h may perform LMC and indicate the LCM to the ML service 305-h, or request the ML service 305-h to perform LCM. The UE 115-h may additionally provide a monitoring report to the ML service 305-h.

Additionally, or alternatively, at 1012, LCM operations may be controlled by the network entity 105-h. In such cases, the LCM may be triggered based on one or more thresholds, which may be determined by the network entity 105-*h* based on a UE monitoring report (e.g., a report received at 1010) or monitoring by the network entity 105-*h*.

For LCM control signaling, at 1015, the UE 115-*h* may send an LCM control request to the network entity 105-*h*. The request may be an indication to activate, deactivate, switch, or fallback the current ML configuration. At 1020, the network entity 105-*h* may send an LCM control signaling to the ML service 305-*h* that forwards the request to activate, deactivate, switch, or fallback the current ML configuration. The request may include a configuration request (e.g., reconfiguration request) to switch from one AI/ML function to another AI/ML function, from an AI/ML based to a non-AI/ML based procedure, or from a non-AI/ML based to AI/ML based procedure. At 1025, the network entity 105-*h* may transmit the LCM control signaling to the UE 115-*h* to indicate the configuration (e.g., reconfiguration) to the UE 115-*h*.

In some examples, the ML service 305-*h* may perform LCM control signaling (e.g., deactivation, switching, fallback, and so forth) based on a request form the UE 115. In such examples, the network entity 105-*h* sends LCM control signals to the ML services 305-*h* and LCM control signals to the UE 115-*h*. As such, the UE 115-*h* may perform LMC and indicate the results to the ML service 305-*h*, the UE 115-*h* may request the ML service 305-*h* to perform the LCM, or the UE 115-*h* may send a monitoring report (e.g., to the network entity 105).

In some examples, the LCM may be controlled by the network entity 105-*h* (e.g., based on UE monitoring report or monitoring at the network entity 105). In such examples, the network entity 105-*h* may translate system KPIs to ML Service KPIs based on qualitative or quantitative mapping between system KPIs and ML service KPIs provided by the ML service 305-*h*, LCM triggers (e.g., thresholds) provided by the ML service 305-*h*, or ML service KPIs. The network entity 105-*h* may evaluate system performance (e.g., network entity 105-*h* computed or UE reported), as well as monitoring events (e.g., as implemented by the network entity 105-*h*).

The network entity 105-*h* may configure the UE 115-*h* to provide a monitoring report. Accordingly, at 1030, the UE 115-*h* may transmit a monitoring report to the network entity 105, and the report may be used for evaluating the system performance or for monitoring events. Additionally, in such examples, the network entity 105-*h* may provide LCM control signaling, as discussed with respect to 1020 and 1025 (e.g., and without the LCM request at 1015). The LCM control signaling may include a request or an indication to activate, deactivate, switch, or fallback the current ML configuration. The request may include a configuration request (e.g., reconfiguration request) to switch from one AI/ML function to another AI/ML function, from an AI/ML based to a non-AI/ML based procedure, or from a non-AI/ML based to AI/ML based procedure. The network entity 105-*h* may transmit the LCM control signaling to the UE 115-*h* to indicate the configuration (e.g., reconfiguration) to the UE 115. In some examples, the network entity 105-*h* may perform LCM Control Signaling based on performance and event monitoring. The network entity 105-*h* may sends LCM control signals to the ML service 305-*h* or the UE 115-*h*.

In some examples, (e.g., at 1040) the LCM may be controlled by the ML service 305-*h* (e.g., based on UE monitoring report, monitoring at the network entity 105, or ML service monitoring). In such examples, the ML service 305-*h* may evaluate ML service KPIs based on the monitoring report from UE 115-*h* and the network entity 105. Accordingly, at 1035, the UE 115-*h* may send monitoring input data to the network entity 105, which may forward the input data to the ML service 305-*h* at 1040 (e.g., performance monitoring at the ML service). The ML service 305-*h* may evaluate ML service KPIs based on monitoring input data (e.g., ground truth for evaluating feedback KPIs at the ML service 305-*h*).

In such examples, the LCM control signaling for the ML service 305-*h* may be performed as discussed with respect to 1020 and 1025, except the ML service 305-*h* sends the LCM control signaling to the network entity 105-*h* at 1045 (e.g., rather than the network entity 105-*h* sending the LCM control signaling to the ML service 305-*h*). As such, at 1050, the network entity 105-*h* may forward the LCM control signaling to the UE 115-*h*.

Figure 11:
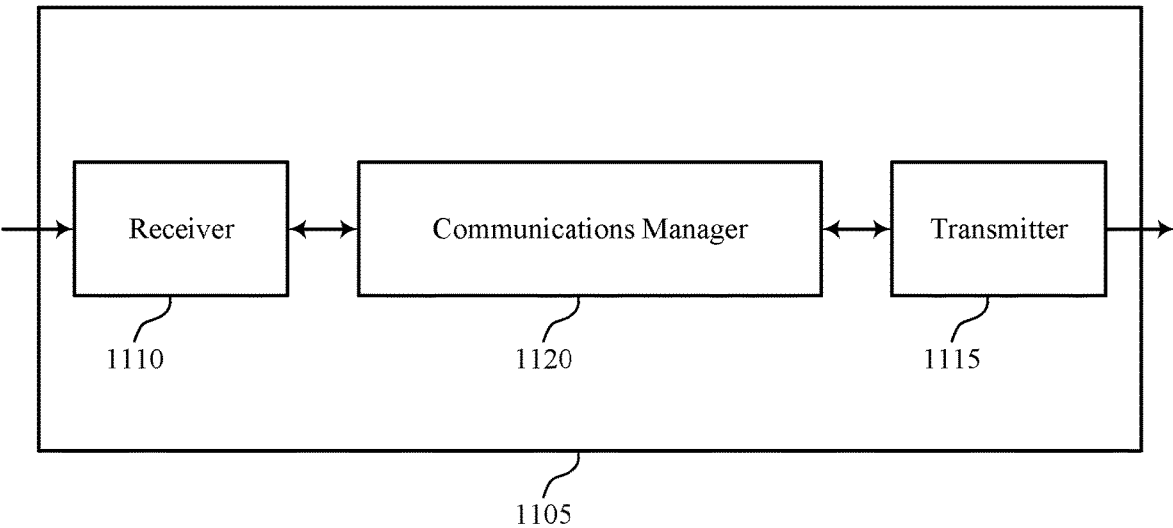
FIGS. 11 and 12 show block diagrams of devices that support cross-node AI/ML services in accordance with one or more aspects of the present disclosure.

FIG. 11 shows a block diagram 1100 of a device 1105 that supports cross-node AI/ML services in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of cross-node AI/ML services as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for obtaining a first message indicating one or more machine learning capabilities of a UE. The communications manager 1120 is capable of, configured to, or operable to support a means for obtaining, from a machine learning service, a second message indicating one or more machine learning service capabilities of the machine learning service. The communications manager 1120 is capable of, configured to, or operable to support a means for outputting, to the UE, a control message indicating one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for updating the UE 115 with ML models that facilitate the UE in performing as expected (e.g., above a performance threshold) and as compatible with the ML service 305, for example, even when the UE 115 does not have access to or is not in communication with the ML service 305.

Figure 12:
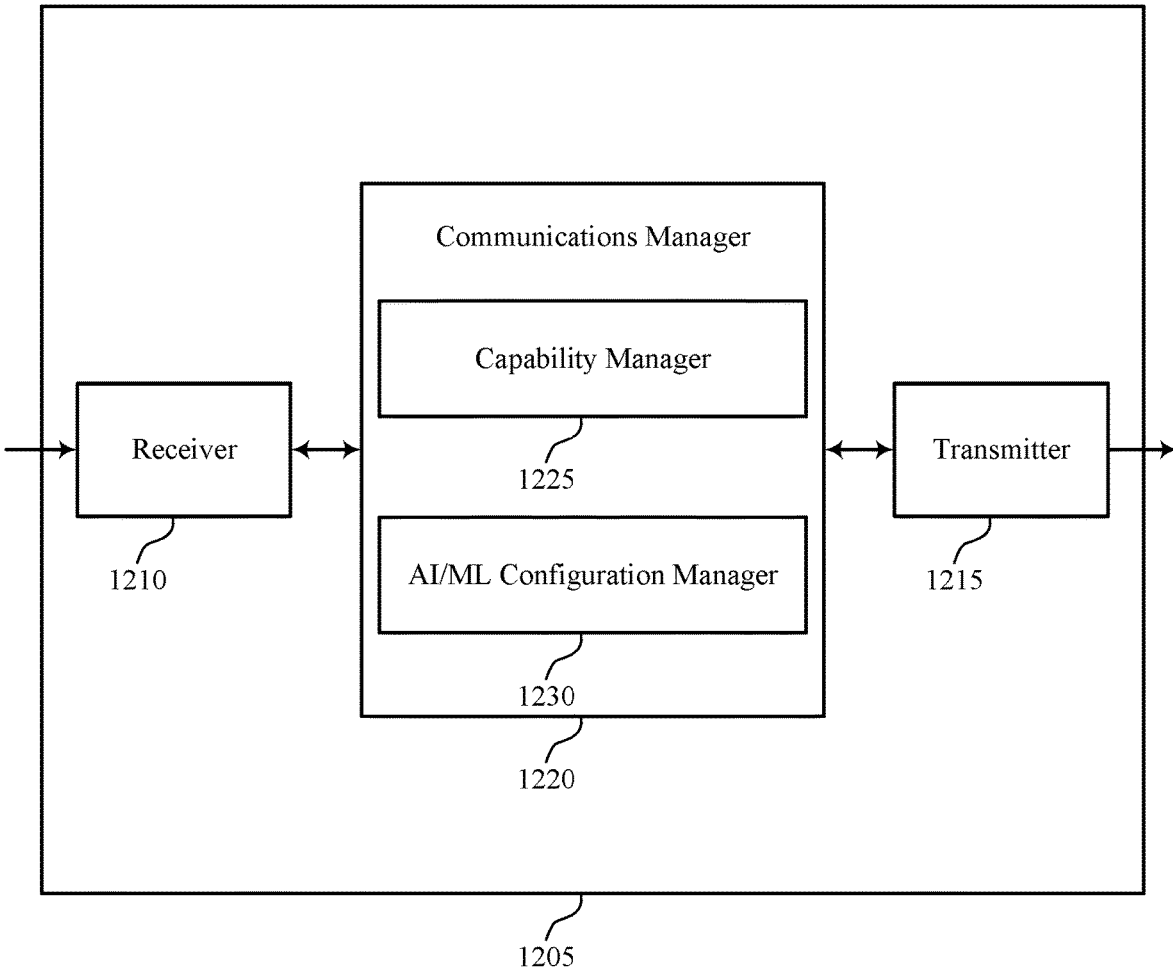
Figure 12:

FIG. 12 shows a block diagram 1200 of a device 1205 that supports cross-node AI/ML services in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one of more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of cross-node AI/ML services as described herein. For example, the communications manager 1220 may include a capability manager 1225 an AI/ML configuration manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver

1210, the transmitter 1215, or both to obtain information, output information, or perform various other operations as described herein.

The communications manager 1220 may support wireless communications in accordance with examples as disclosed herein. The capability manager 1225 is capable of, configured to, or operable to support a means for obtaining a first message indicating one or more machine learning capabilities of a UE. The capability manager 1225 is capable of, configured to, or operable to support a means for obtaining, from a machine learning service, a second message indicating one or more machine learning service capabilities of the machine learning service. The AI/ML configuration manager 1230 is capable of, configured to, or operable to support a means for outputting, to the UE, a control message indicating one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service.

Figure 13:
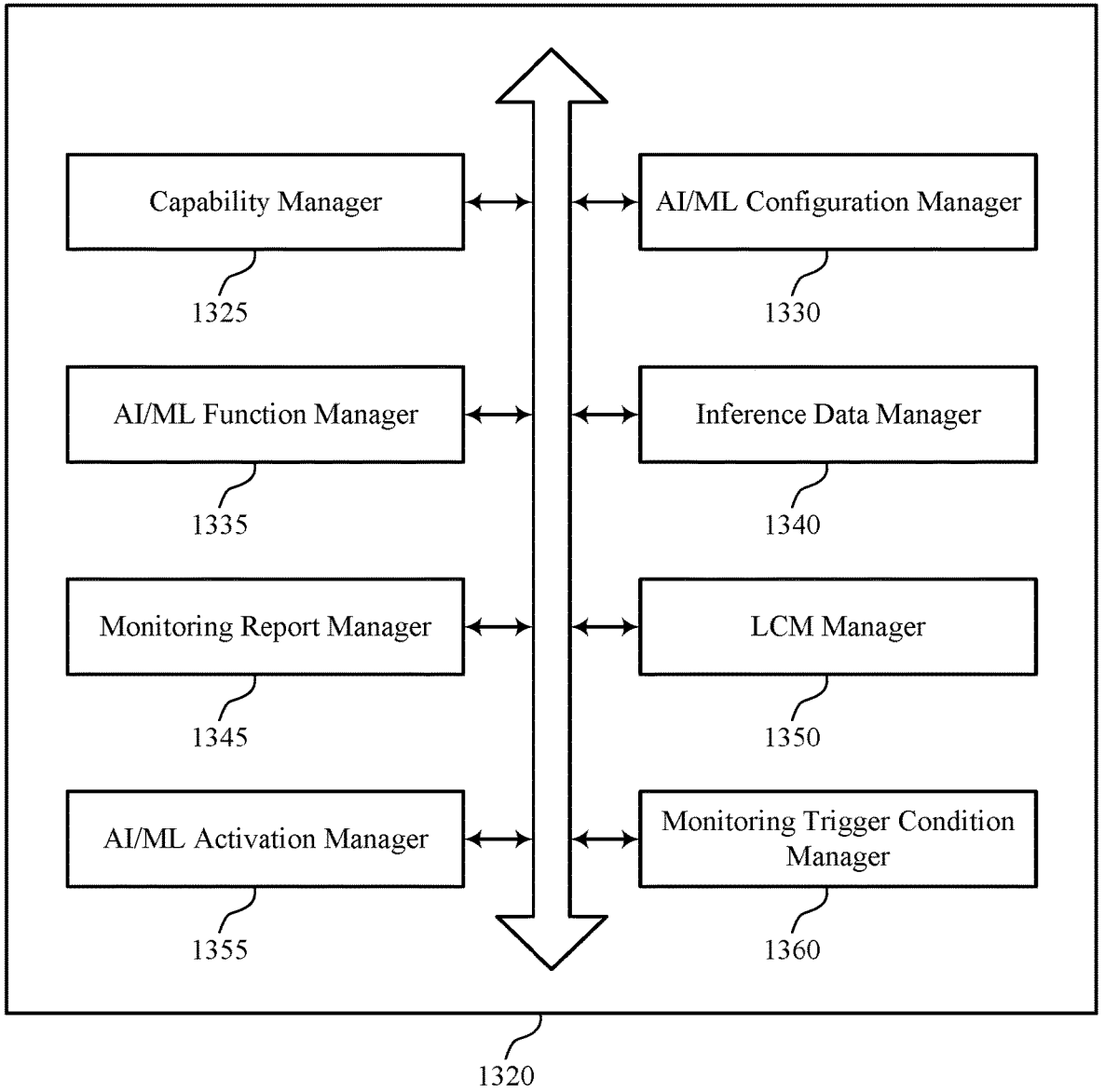
FIG. 13 shows a block diagram of a communications manager that supports cross-node AI/ML services in accordance with one or more aspects of the present disclosure.

FIG. 13 shows a block diagram 1300 of a communications manager 1320 that supports cross-node AI/ML services in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of cross-node AI/ML services as described herein. For example, the communications manager 1320 may include a capability manager 1325, an AI/ML configuration manager 1330, an AI/ML function manager 1335, an inference data manager 1340, a monitoring report manager 1345, an LCM manager 1350, an AI/ML activation manager 1355, a monitoring trigger condition manager 1360, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The capability manager 1325 is capable of, configured to, or operable to support a means for obtaining a first message indicating one or more machine learning capabilities of a UE. In some examples, the capability manager 1325 is capable of, configured to, or operable to support a means for obtaining, from a machine learning service, a second message indicating one or more machine learning service capabilities of the machine learning service. The AI/ML configuration manager 1330 is capable of, configured to, or operable to support a means for outputting, to the UE, a control message indicating one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service.

In some examples, the capability manager 1325 is capable of, configured to, or operable to support a means for outputting, to the machine learning service, a service capability request message for the one or more machine learning service capabilities, where the second message indicating the one or more machine learning service capabilities is obtained in response to the service capability request message, and where the one or more machine learning service capabilities include capabilities that are compatible with the UE based on the one or more machine learning capabilities of the UE.

In some examples, the service capability request message includes a set of UE identifiers including an identifier of the UE, an indication of the one or more machine learning capabilities of to the UE, or any combination thereof.

In some examples, to support obtaining the second message indicating the one or more machine learning service capabilities, the capability manager 1325 is capable of, configured to, or operable to support a means for obtaining, from the machine learning service, an announcement of the one or more machine learning service capabilities, the announcement including the second message.

In some examples, the AI/ML function manager 1335 is capable of, configured to, or operable to support a means for selecting, based on the one or more machine learning capabilities of the UE and the one or more machine learning service capabilities of the machine learning service, the one or more machine learning functions. In some examples, the AI/ML configuration manager 1330 is capable of, configured to, or operable to support a means for outputting, to the machine learning service, a configuration request message requesting one or more cross-node machine learning configurations based on the selecting. In some examples, the AI/ML configuration manager 1330 is capable of, configured to, or operable to support a means for obtaining, from the machine learning service, a configuration response message that indicates the one or more cross-node machine learning configurations, the one or more machine learning functions, a set of UE identifiers including an identifier of the UE, or any combination thereof, where the control message indicating one or more cross-node machine learning configurations is based on obtaining the configuration response message.

In some examples, the AI/ML configuration manager 1330 is capable of, configured to, or operable to support a means for obtaining a third message indicating completion of the one or more cross-node machine learning configurations by the UE in response to the control message.

In some examples, the AI/ML configuration manager 1330 is capable of, configured to, or operable to support a means for outputting, to the machine learning service, a fourth message indicating that the one or more cross-node machine learning configurations have been configured by the UE.

In some examples, the AI/ML function manager 1335 is capable of, configured to, or operable to support a means for outputting a second control message including an indication to activate the one or more machine learning functions based on the one or more cross-node machine learning configurations.

In some examples, the AI/ML activation manager 1355 is capable of, configured to, or operable to support a means for outputting, to the machine learning service, an activation request message indicating a set of UE identifiers including an identifier of the UE, the one or more machine learning functions, or any combination thereof. In some examples, the AI/ML activation manager 1355 is capable of, configured to, or operable to support a means for obtaining, from the machine learning service, an activation acknowledgment message from the machine learning service in response to the activation request message, the activation acknowledgment message indicating the set of UE identifiers including the identifier of the UE, the one or more machine learning functions, or any combination thereof, where the second control message is output based on the activation acknowledgment message.

In some examples, the AI/ML activation manager 1355 is capable of, configured to, or operable to support a means for obtaining, from the machine learning service, an activation request message indicating a set of UE identifiers including an identifier of the UE, the one or more machine learning functions, or any combination thereof. In some examples, the AI/ML activation manager 1355 is capable of, configured to, or operable to support a means for outputting, to the machine learning service, an activation acknowledgment message from the machine learning service in response to the activation request message, the activation acknowledgment message indicating the set of UE identifiers including the identifier of the UE, the one or more machine learning functions, or any combination thereof, where the second control message is output based on the activation acknowledgment message.

In some examples, the AI/ML activation manager 1355 is capable of, configured to, or operable to support a means for obtaining, from the UE, a first activation request message indicating the one or more machine learning functions. In some examples, the AI/ML activation manager 1355 is capable of, configured to, or operable to support a means for outputting, to the machine learning service and in response to the first activation request message, a second activation request message indicating a set of UE identifiers including an identifier of the UE, the one or more machine learning functions, or any combination thereof. In some examples, the AI/ML activation manager 1355 is capable of, configured to, or operable to support a means for obtaining an activation acknowledgment message from the machine learning service in response to the second activation request message, the activation acknowledgment message indicating the set of UE identifiers including the identifier of the UE, the one or more machine learning functions, or any combination thereof, where the second control message is output based on the activation acknowledgment message.

In some examples, the inference data manager 1340 is capable of, configured to, or operable to support a means for obtaining a sixth message including UE inference input data associated with the one or more machine learning functions. In some examples, the inference data manager 1340 is capable of, configured to, or operable to support a means for outputting, to the machine learning service, a service data request message including the UE inference input data. In some examples, the inference data manager 1340 is capable of, configured to, or operable to support a means for obtaining, from the machine learning service, a service data response message indicating machine learning service inference output data associated with the one or more machine learning functions.

In some examples, the inference data manager 1340 is capable of, configured to, or operable to support a means for outputting, to the UE, a seventh message including the machine learning service inference output data from the machine learning service.

In some examples, the monitoring trigger condition manager 1360 is capable of, configured to, or operable to support a means for monitoring for one or more trigger conditions based on the UE inference input data, machine learning service inference input data from the machine learning service, or any combination thereof. In some examples, the AI/ML function manager 1335 is capable of, configured to, or operable to support a means for outputting, to the UE, a third control message including an indication to switch or deactivate at least one of the one or more machine learning functions based on an occurrence of the one or more trigger conditions.

In some examples, the one or more trigger conditions includes a measurement of one or more key performance indicators satisfying a key performance indicator threshold.

In some examples, the monitoring report manager 1345 is capable of, configured to, or operable to support a means for outputting, to the machine learning service, a monitoring report that indicates one or more key performance indicators associated with the one or more machine learning functions.

In some examples, the one or more trigger conditions are based on a monitoring report including measurements performed by the UE, by the network entity, or any combination thereof.

In some examples, the monitoring report manager 1345 is capable of, configured to, or operable to support a means for obtaining a monitoring report from the UE, the monitoring report including one or more key performance indicators associated with the one or more machine learning functions. In some examples, the AI/ML function manager 1335 is capable of, configured to, or operable to support a means for outputting, to the UE, an indication to switch or deactivate the one or more machine learning functions of the UE based on an occurrence of one or more trigger conditions.

In some examples, the monitoring report manager 1345 is capable of, configured to, or operable to support a means for outputting, to the machine learning service, a monitoring report that indicates one or more key performance indicators associated with the one or more machine learning functions.

In some examples, the LCM manager 1350 is capable of, configured to, or operable to support a means for obtaining, from the UE, life cycle management control request message including a request for life cycle management control signaling, the life cycle management control signaling including an indication for activating, deactivating, switching, a default configuration, or any combination thereof, of the one or more cross-node machine learning configurations. In some examples, the LCM manager 1350 is capable of, configured to, or operable to support a means for outputting, to the machine learning service, a first life cycle management control message including an indication of request for the life cycle management control signaling in response to the life cycle management control request message. In some examples, the LCM manager 1350 is capable of, configured to, or operable to support a means for outputting, to the UE, a second life cycle management control message including and indication of the life cycle management control signaling indicated by the machine learning service.

In some examples, obtaining the life cycle management control request message is based on a monitoring report from the UE, the network entity, or a combination thereof.

Figure 14:
FIG. 14 shows a diagram of a system including a device that supports cross-node AI/ML services in accordance with one or more aspects of the present disclosure.

FIG. 14 shows a diagram of a system 1400 including a device 1405 that supports cross-node AI/ML services in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting cross-node AI/ML services). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. As such, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for obtaining a first message indicating one or more machine learning capabilities of a UE. The communications manager 1420 is capable of, configured to, or operable to support a means for obtaining, from a machine learning service, a second message indicating one or more machine learning service capabilities of the machine learning service. The communications manager 1420 is capable of, configured to, or operable to support a means for outputting, to the UE, a control message indicating one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service.

By including or configuring the communications manager 1420 in accordance with examples as described herein, the device 1405 may support techniques for updating the UE 115 with ML models that facilitate the UE in performing as expected (e.g., above a performance threshold) and as compatible with the ML service 305, for example, even when the UE 115 does not have access to or is not in communication with the ML service 305.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of cross-node AI/ML services as described herein, or the at least one processor 1435 and the at least one memory 1425 may be otherwise configured to, individually or collectively, perform or support such operations.

Figure 15:
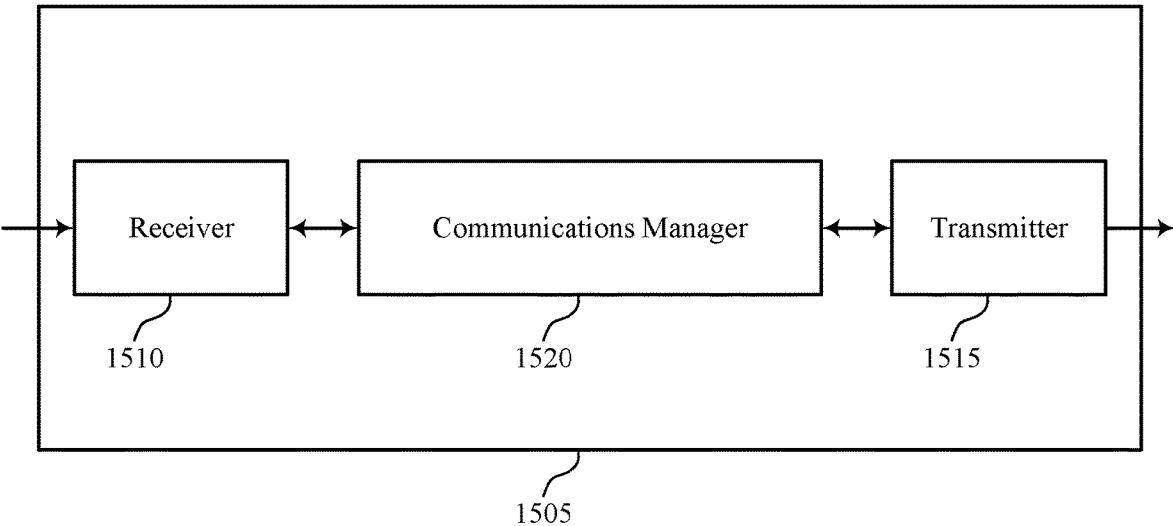
FIGS. 15 and 16 show block diagrams of devices that support cross-node AI/ML services in accordance with one or more aspects of the present disclosure.

FIG. 15 shows a block diagram 1500 of a device 1505 that supports cross-node AI/ML services in accordance with one or more aspects of the present disclosure. The device 1505 may be an example of aspects of a UE 115 as described herein. The device 1505 may include a receiver 1510, a transmitter 1515, and a communications manager 1520. The device 1505, or one or more components of the device 1505 (e.g., the receiver 1510, the transmitter 1515, and the communications manager 1520), may include at least one processor, which may be coupled with at least one memory, to, individually or collectively, support or enable the described techniques. Each of these components may be in communication with one another (e.g., via one or more buses).

The receiver 1510 may provide a means for receiving information such as packets, user data, control information, or any combination thereof associated with various information channels (e.g., control channels, data channels, information channels related to cross-node AI/ML services). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to cross-node AI/ML services). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of cross-node AI/ML services as described herein. For example, the communications manager 1520, the receiver 1510, the transmitter 1515, or various combinations or components thereof may be capable of performing one or more of the functions described herein.

In some examples, the communications manager 1520, the receiver 1510, the transmitter 1515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1520, the receiver 1510, the transmitter 1515, or various combinations or components thereof may be implemented in code (e.g., as communications management software or firmware) executed by at least one processor. If implemented in code executed by at least one processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications in accordance with examples as disclosed herein. For example, the communications manager 1520 is capable of, configured to, or operable to support a means for receiving a first message indicating one or more life cycle management trigger conditions for a channel between the UE and a network entity. The communications manager 1520 is capable of, configured to, or operable to support a means for transmitting, to the network entity, a life cycle management control request message including a request for life cycle management control signaling in response to an occurrence of the one or more life cycle management trigger conditions, where the life cycle management control signaling includes an indication for activating, deactivating, switching, a default configuration, or any combination thereof, of one or more cross-node machine learning configurations for the UE. The communications manager 1520 is capable of, configured to, or operable to support a means for receiving, from the network entity, a second message indicating the life cycle management control signaling in response to the life cycle management control request message.

By including or configuring the communications manager 1520 in accordance with examples as described herein, the device 1505 (e.g., at least one processor controlling or otherwise coupled with the receiver 1510, the transmitter 1515, the communications manager 1520, or a combination thereof) may support techniques for updating the UE 115 with ML models that facilitate the UE in performing as expected (e.g., above a performance threshold) and as compatible with the ML service 305, for example, even when the UE 115 does not have access to or is not in communication with the ML service 305.

Figure 16:
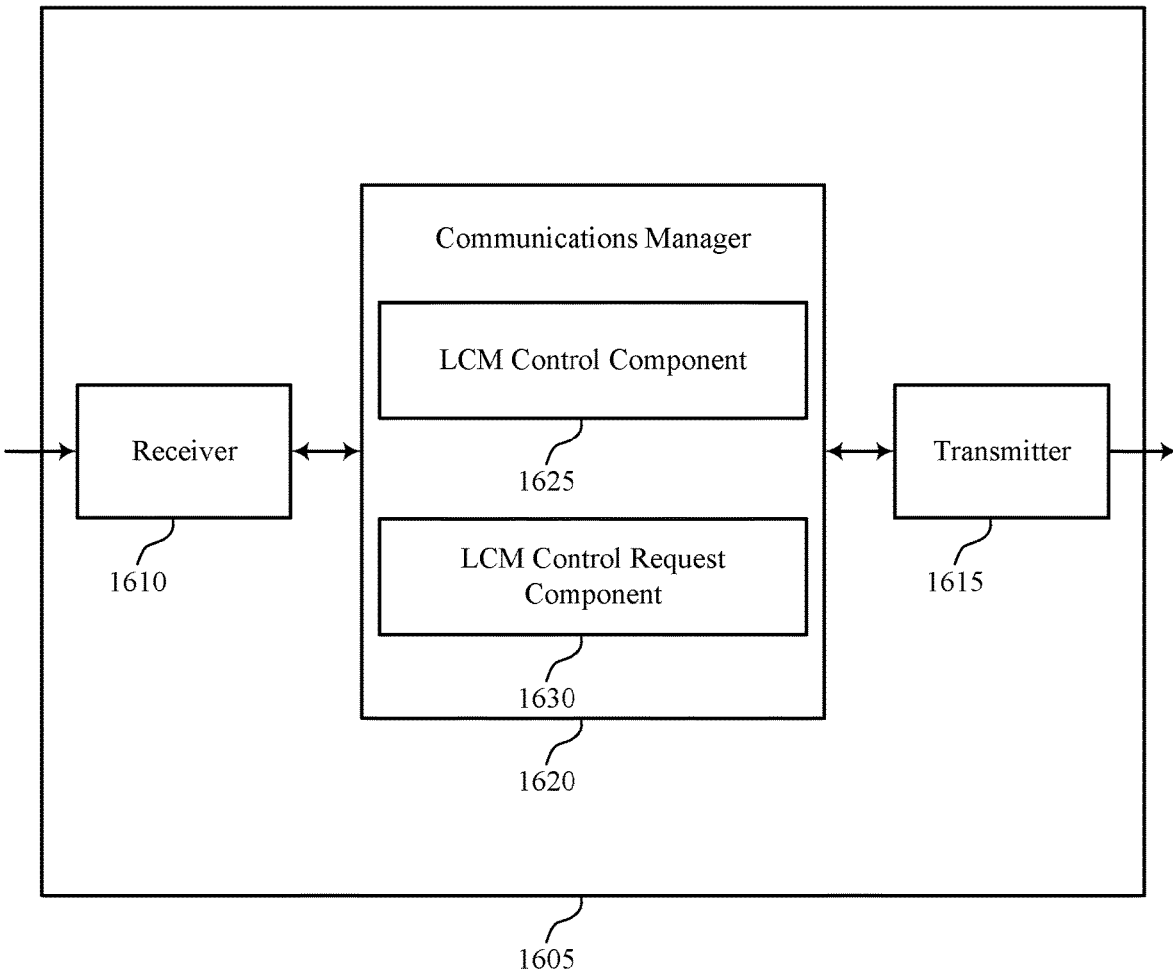

FIG. 16 shows a block diagram 1600 of a device 1605 that supports cross-node AI/ML services in accordance with one or more aspects of the present disclosure. The device 1605 may be an example of aspects of a device 1505 or a UE 115 as described herein. The device 1605 may include a receiver 1610, a transmitter 1615, and a communications manager 1620. The device 1605, or one of more components of the device 1605 (e.g., the receiver 1610, the transmitter 1615, and the communications manager 1620), may include at least one processor, which may be coupled with at least one memory, to support the described techniques. Each of these components may be in communication with one another (e.g., via one or more buses).

The receiver 1610 may provide a means for receiving information such as packets, user data, control information, or any combination thereof associated with various information channels (e.g., control channels, data channels, information channels related to cross-node AI/ML services). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to cross-node AI/ML services). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of cross-node AI/ML services as described herein. For example, the communications manager 1620 may include an LCM control component 1625 an LCM control request component 1630, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communications in accordance with examples as disclosed herein. The LCM control component 1625 is capable of, configured to, or operable to support a means for receiving a first message indicating one or more life cycle management trigger conditions for a channel between the UE and a network entity. The LCM control request component 1630 is capable of, configured to, or operable to support a means for transmitting, to the network entity, a life cycle management control request message including a request for life cycle management control signaling in response to an occurrence of the one or more life cycle management trigger conditions, where the life cycle management control signaling includes an indication for activating, deactivating, switching, a default configuration, or any combination thereof, of one or more cross-node machine learning configurations for the UE. The LCM control component 1625 is capable of, configured to, or operable to support a means for receiving, from the network entity, a second message indicating the life cycle management control signaling in response to the LCM control request message.

Figure 17:
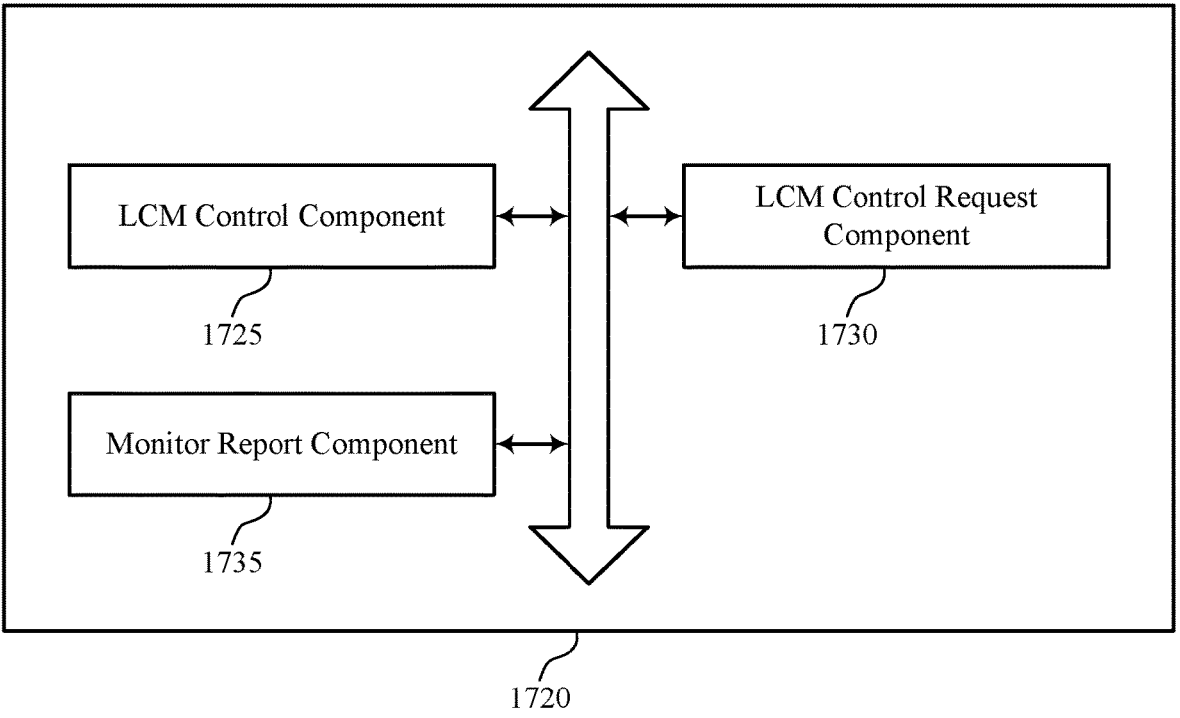
FIG. 17 shows a block diagram of a communications manager that supports cross-node AI/ML services in accordance with one or more aspects of the present disclosure.

FIG. 17 shows a block diagram 1700 of a communications manager 1720 that supports cross-node AI/ML services in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of cross-node AI/ML services as described herein. For example, the communications manager 1720 may include an LCM control component 1725, an LCM control request component 1730, a monitor report component 1735, or any combination thereof. Each of these components, or components or subcomponents thereof (e.g., one or more processors, one or more memories), may communicate, directly or indirectly, with one another (e.g., via one or more buses).

The communications manager 1720 may support wireless communications in accordance with examples as disclosed herein. The LCM control component 1725 is capable of, configured to, or operable to support a means for receiving a first message indicating one or more LCM trigger conditions for a channel between the UE and a network entity. The LCM control request component 1730 is capable of, configured to, or operable to support a means for transmitting, to the network entity, a LCM control request message including a request for LCM control signaling in response to an occurrence of the one or more LCM trigger conditions, where the LCM control signaling includes an indication for activating, deactivating, switching, a default configuration, or any combination thereof, of one or more cross-node machine learning configurations for the UE. In some examples, the LCM control component 1725 is capable of, configured to, or operable to support a means for receiving, from the network entity, a second message indicating the LCM control signaling in response to the LCM control request message.

In some examples, the monitor report component 1735 is capable of, configured to, or operable to support a means for transmitting, to the network entity, a monitoring report that indicates one or more key performance indicators associated with the UE, where receiving the second message indicating the LCM control signaling is based on the monitoring report.

In some examples, the one or more LCM trigger conditions include one or more thresholds associated an inference performance of the UE, one or more key performance indicators associated with the UE, or a combination thereof.

Figure 18:
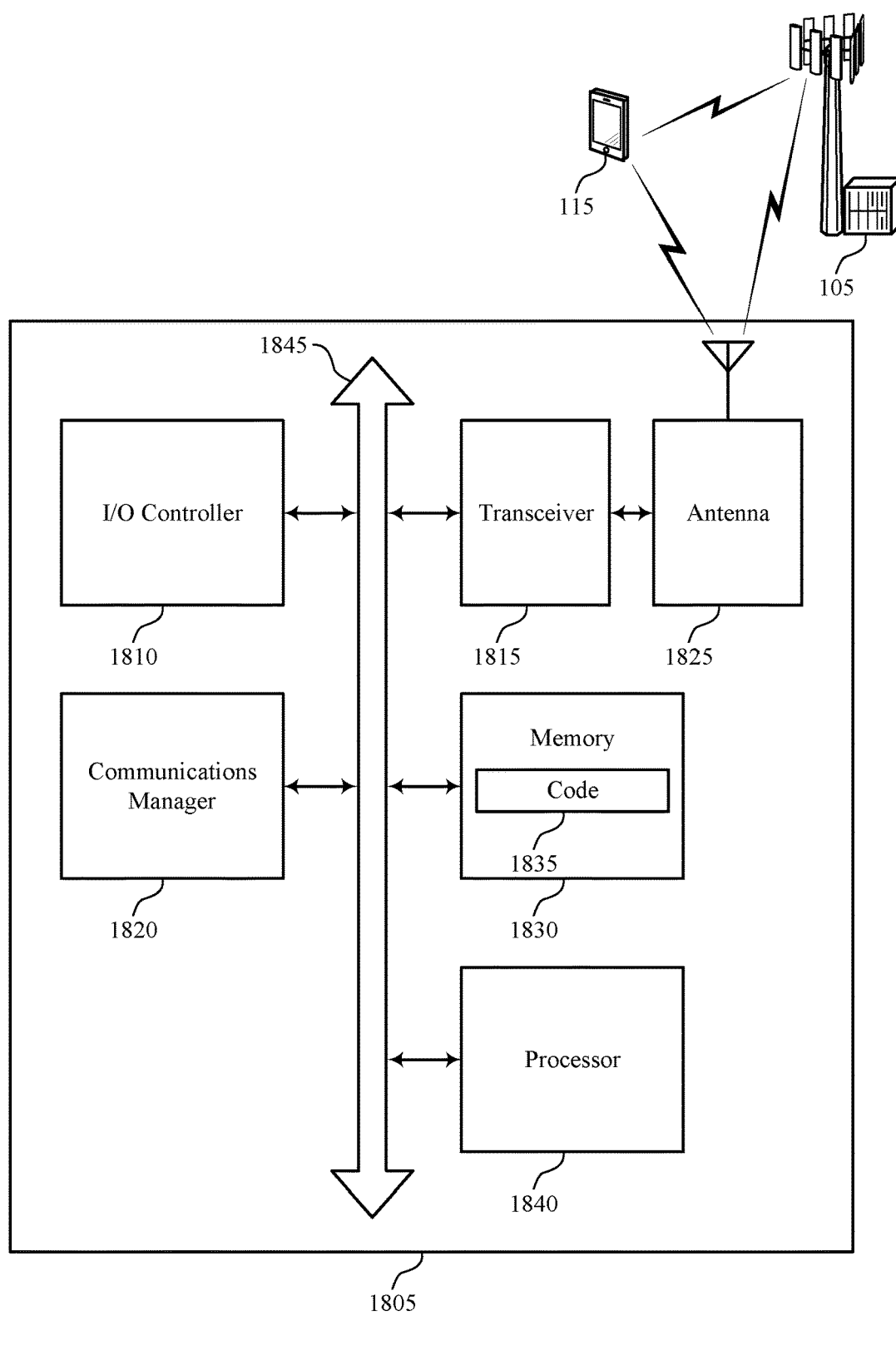
FIG. 18 shows a diagram of a system including a device that supports cross-node AI/ML services in accordance with one or more aspects of the present disclosure.

FIG. 18 shows a diagram of a system 1800 including a device 1805 that supports cross-node AI/ML services in accordance with one or more aspects of the present disclosure. The device 1805 may be an example of or include the components of a device 1505, a device 1605, or a UE 115 as described herein. The device 1805 may communicate (e.g., wirelessly) with one or more network entities 105, one or more UEs 115, or any combination thereof. The device 1805 may include components for bi-directional voice and data communications including components for transmitting and receiving communications, such as a communications manager 1820, an input/output (I/O) controller 1810, a transceiver 1815, an antenna 1825, at least one memory 1830, code 1835, and at least one processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally or alternatively, the I/O controller 1810 may represent or interact with a modem, a keyboard, a mouse, a touchscreen, or a similar device. In some cases, the I/O controller 1810 may be implemented as part of one or more processors, such as the at least one processor 1840. In some cases, a user may interact with the device 1805 via the I/O controller 1810 or via hardware components controlled by the I/O controller 1810.

In some cases, the device 1805 may include a single antenna 1825. However, in some other cases, the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The at least one memory 1830 may include random access memory (RAM) and read-only memory (ROM). The at least one memory 1830 may store computer-readable, computer-executable code 1835 including instructions that, when executed by the at least one processor 1840, cause the device 1805 to perform various functions described herein. The code 1835 may be stored in a non-transitory computer-readable medium such as system memory or another type of memory. In some cases, the code 1835 may not be directly executable by the at least one processor 1840 but may cause a computer (e.g., when compiled and executed) to perform functions described herein. In some cases, the at least one memory 1830 may contain, among other things, a basic I/O system (BIOS) which may control basic hardware or software operation such as the interaction with peripheral components or devices.

The at least one processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1840 may be configured to operate a memory array using a memory controller. In some other cases, a memory controller may be integrated into the at least one processor 1840. The at least one processor 1840 may be configured to execute computer-readable instructions stored in a memory (e.g., the at least one memory 1830) to cause the device 1805 to perform various functions (e.g., functions or tasks supporting cross-node AI/ML services). For example, the device 1805 or a component of the device 1805 may include at least one processor 1840 and at least one memory 1830 coupled with or to the at least one processor 1840, the at least one processor 1840 and at least one memory 1830 configured to perform various functions described herein. In some examples, the at least one processor 1840 may include multiple processors and the at least one memory 1830 may include multiple memories. One or more of the multiple processors may be coupled with one or more of the multiple memories, which may, individually or collectively, be configured to perform various functions herein. In some examples, the at least one processor 1840 may be a component of a processing system, which may refer to a system (such as a series) of machines, circuitry (including, for example, one or both of processor circuitry (which may include the at least one processor 1840) and memory circuitry (which may include the at least one memory 1830)), or components, that receives or obtains inputs and processes the inputs to produce, generate, or obtain a set of outputs. The processing system may be configured to perform one or more of the functions described herein. As such, the at least one processor 1840 or a processing system including the at least one processor 1840 may be configured to, configurable to, or operable to cause the device 1805 to perform one or more of the functions described herein. Further, as described herein, being "configured to," being "configurable to," and being "operable to" may be used interchangeably and may be associated with a capability, when executing code stored in the at least one memory 1830 or otherwise, to perform one or more of the functions described herein.

The communications manager 1820 may support wireless communications in accordance with examples as disclosed herein. For example, the communications manager 1820 is capable of, configured to, or operable to support a means for receiving a first message indicating one or more LCM trigger conditions for a channel between the UE and a network entity. The communications manager 1820 is capable of, configured to, or operable to support a means for transmitting, to the network entity, a LCM control request message including a request for LCM control signaling in response to an occurrence of the one or more LCM trigger conditions, where the LCM control signaling includes an indication for activating, deactivating, switching, a default configuration, or any combination thereof, of one or more cross-node machine learning configurations for the UE. The communications manager 1820 is capable of, configured to, or operable to support a means for receiving, from the network entity, a second message indicating the LCM control signaling in response to the LCM control request message.

By including or configuring the communications manager 1820 in accordance with examples as described herein, the device 1805 may support techniques for updating the UE 115 with ML models that facilitate the UE in performing as expected (e.g., above a performance threshold) and as compatible with the ML service 305, for example, even when the UE 115 does not have access to or is not in communication with the ML service 305.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the at least one processor 1840, the at least one memory 1830, the code 1835, or any combination thereof. For example, the code 1835 may include instructions executable by the at least one processor 1840 to cause the device 1805 to perform various aspects of cross-node AI/ML services as described herein, or the at least one processor 1840 and the at least one memory 1830 may be otherwise configured to, individually or collectively, perform or support such operations.

FIG. 19 shows a flowchart illustrating a method 1900 that supports cross-node AI/ML services in accordance with aspects of the present disclosure. The operations of the method 1900 may be implemented by a network entity or its components as described herein. For example, the operations of the method 1900 may be performed by a network entity as described with reference to FIGS. 1 through 18. In some examples, a network entity may execute a set of instructions to control the functional elements of the network entity to perform the described functions. Additionally, or alternatively, the network entity may perform aspects of the described functions using special-purpose hardware.

At 1905, the method may include obtaining a first message indicating one or more machine learning capabilities of a UE. The operations of 1905 may be performed in accordance with examples as disclosed herein. In some examples, aspects of the operations of 1905 may be performed by a capability manager 25 as described with reference to FIG. 12.

At 1910, the method may include obtaining, from a machine learning service, a second message indicating one or more machine learning service capabilities of the machine learning service. The operations of 1910 may be performed in accordance with examples as disclosed herein. In some examples, aspects of the operations of 1910 may be performed by a capability manager 25 as described with reference to FIG. 12.

At 1915, the method may include outputting, to the UE, a control message indicating one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service. The operations of 1915 may be performed in accordance with examples as disclosed herein. In some examples, aspects of the operations of 1915 may be performed by an AI/ML configuration manager 30 as described with reference to FIG. 12.

FIG. 20 shows a flowchart illustrating a method 2000 that supports cross-node AI/ML services in accordance with aspects of the present disclosure. The operations of the method 2000 may be implemented by a network entity or its components as described herein. For example, the operations of the method 2000 may be performed by a network entity as described with reference to FIGS. 1 through 18. In some examples, a network entity may execute a set of instructions to control the functional elements of the network entity to perform the described functions. Additionally, or alternatively, the network entity may perform aspects of the described functions using special-purpose hardware.

At 2005, the method may include outputting, to the machine learning service, a service capability request message for the one or more machine learning service capabilities, where the second message indicating the one or more machine learning service capabilities is obtained in response to the service capability request message, and where the one or more machine learning service capabilities include capabilities that are compatible with the UE based on the one or more machine learning capabilities of the UE. The operations of 2005 may be performed in accordance with examples as disclosed herein. In some examples, aspects of the operations of 2005 may be performed by an AI/ML configuration manager 30 as described with reference to FIG. 12.

At 2010, the method may include obtaining a first message indicating one or more machine learning capabilities of a UE. The operations of 2010 may be performed in accordance with examples as disclosed herein. In some examples, aspects of the operations of 2010 may be performed by a capability manager 25 as described with reference to FIG. 12.

At 2015, the method may include obtaining, from a machine learning service, a second message indicating one or more machine learning service capabilities of the machine learning service. The operations of 2015 may be performed in accordance with examples as disclosed herein. In some examples, aspects of the operations of 2015 may be performed by an capability manager 25 as described with reference to FIG. 12.

At 2020, the method may include outputting, to the UE, a control message indicating one or more cross-node machine learning configurations based on the one or more machine learning capabilities of the UE and the one or more machine learning service capabilities of the machine learning service, where the one or more cross-node machine learning configurations configure one or more machine learning functions of the UE for use with the machine learning service. The operations of 2020 may be performed in accordance with examples as disclosed herein. In some examples, aspects of the operations of 2020 may be performed by an AI/ML configuration manager 30 as described with reference to FIG. 12.

FIG. 21 shows a flowchart illustrating a method 2100 that supports cross-node AI/ML services in accordance with aspects of the present disclosure. The operations of the method 2100 may be implemented by a UE or its components as described herein. For example, the operations of the method 2100 may be performed by a UE 115 as described with reference to FIGS. 1 through 18. In some examples, a UE may execute a set of instructions to control the functional elements of the UE to perform the described functions. Additionally, or alternatively, the UE may perform aspects of the described functions using special-purpose hardware.

At 2105, the method may include receiving a first message indicating one or more LCM trigger conditions for a channel between the UE and a network entity. The operations of 2105 may be performed in accordance with examples as disclosed herein. In some examples, aspects of the operations of 2105 may be performed by an LCM control component 25 as described with reference to FIG. 16.

At 2110, the method may include transmitting, to the network entity, a LCM control request message including a request for LCM control signaling in response to an occurrence of the one or more LCM trigger conditions, where the LCM control signaling includes an indication for activating, deactivating, switching, a default configuration, or any combination thereof, of one or more cross-node machine learning configurations for the UE. The operations of 2110 may be performed in accordance with examples as disclosed herein. In some examples, aspects of the operations of 2110 may be performed by an LCM control request component 30 as described with reference to FIG. 16.

At 2115, the method may include receiving, from the network entity, a second message indicating the LCM control signaling in response to the LCM control request message. The operations of 2115 may be performed in accordance with examples as disclosed herein. In some examples, aspects of the operations of 2115 may be performed by an LCM control component 25 as described with reference to FIG. 16.

FIG. 22 shows a flowchart illustrating a method 2200 that supports cross-node AI/ML services in accordance with aspects of the present disclosure. The operations of the method 2200 may be implemented by a UE or its components as described herein. For example, the operations of the method 2200 may be performed by a UE 115 as described with reference to FIGS. 1 through 18. In some examples, a UE may execute a set of instructions to control the functional elements of the UE to perform the described functions. Additionally, or alternatively, the UE may perform aspects of the described functions using special-purpose hardware.

At 2205, the method may include receiving a first message indicating one or more LCM trigger conditions for a channel between the UE and a network entity. The operations of 2205 may be performed in accordance with examples as disclosed herein. In some examples, aspects of the operations of 2205 may be performed by an LCM control component 25 as described with reference to FIG. 17.

At 2210, the method may include transmitting, to the network entity, a LCM control request message including a request for LCM control signaling in response to an occurrence of the one or more LCM trigger conditions, where the LCM control signaling includes an indication for activating, deactivating, switching, a default configuration, or any combination thereof, of one or more cross-node machine learning configurations for the UE. The operations of 2210 may be performed in accordance with examples as disclosed herein. In some examples, aspects of the operations of 2210 may be performed by an LCM control request component 30 as described with reference to FIG. 17.

At 2215, the method may include transmitting, to the network entity, a monitoring report that indicates one or more key performance indicators associated with the UE. The operations of 2215 may be performed in accordance with examples as disclosed herein. In some examples, aspects of the operations of 2215 may be performed by an monitor report component 35 as described with reference to FIG. 17.

At 2220, the method may include receiving, from the network entity, a second message indicating the LCM control signaling in response to the LCM control request message, where receiving the second message indicating the LCM control signaling is based on the monitoring report. The operations of 2220 may be performed in accordance with examples as disclosed herein. In some examples, aspects of the operations of 2220 may be performed by an LCM control component 25 as described with reference to FIG. 17.

The following provides an overview of aspects of the present disclosure:

Aspect 1: A method for wireless communications at a network entity, comprising: obtaining a first message indicating one or more machine learning capabilities of a UE; obtaining, from a ML service, a second message indicating one or more ML service capabilities of the ML service; and outputting, to the UE, a control message indicating one or more cross-node machine learning configurations based at least in part on the one or more machine learning capabilities of the UE and the one or more ML service capabilities of the ML service, wherein the one or more cross-node machine learning configurations configure one or more machine learning functions of the UE for use with the ML service.

Aspect 2: The method of aspect 1, further comprising: outputting, to the ML service, a service capability request message for the one or more ML service capabilities, wherein the second message indicating the one or more ML service capabilities is obtained in response to the service capability request message, and wherein the one or more ML service capabilities comprise capabilities that are compatible with the UE based at least in part on the one or more machine learning capabilities of the UE.

Aspect 3: The method of aspect 2, wherein the service capability request message comprises a set of UE identifiers including an identifier of the UE, an indication of the one or more machine learning capabilities of to the UE, or any combination thereof.

Aspect 4: The method of any of aspects 1 through 3, wherein obtaining the second message indicating the one or more ML service capabilities comprises: obtaining, from the ML service, an announcement of the one or more ML service capabilities, the announcement comprising the second message.

Aspect 5: The method of any of aspects 1 through 4, further comprising: selecting, based at least in part on the one or more machine learning capabilities of the UE and the one or more ML service capabilities of the ML service, the one or more machine learning functions: outputting, to the ML service, a configuration request message requesting one or more cross-node machine learning configurations based at least in part on the selecting; and obtaining, from the ML service, a configuration response message that indicates the one or more cross-node machine learning configurations, the one or more machine learning functions, a set of UE identifiers including an identifier of the UE, or any combination thereof, wherein the control message indicating one or more cross-node machine learning configurations is based at least in part on obtaining the configuration response message.

Aspect 6: The method of any of aspects 1 through 5, further comprising: obtaining a third message indicating completion of the one or more cross-node machine learning configurations by the UE in response to the control message.

Aspect 7: The method of aspect 6, further comprising: outputting, to the ML service, a fourth message indicating that the one or more cross-node machine learning configurations have been configured by the UE.

Aspect 8: The method of any of aspects 1 through 7, further comprising: outputting a second control message comprising an indication to activate the one or more machine learning functions based at least in part on the one or more cross-node machine learning configurations.

Aspect 9: The method of aspect 8, further comprising: outputting, to the ML service, an activation request message indicating a set of UE identifiers including an identifier of the UE, the one or more machine learning functions, or any combination thereof; and obtaining, from the ML service, an activation acknowledgment message from the ML service in response to the activation request message, the activation acknowledgment message indicating the set of UE identifiers including the identifier of the UE, the one or more machine learning functions, or any combination thereof, wherein the second control message is output based at least in part on the activation acknowledgment message.

Aspect 10: The method of any of aspects 8 through 9, further comprising: obtaining, from the ML service, an activation request message indicating a set of UE identifiers including an identifier of the UE, the one or more machine learning functions, or any combination thereof; and outputting, to the ML service, an activation acknowledgment message from the ML service in response to the activation request message, the activation acknowledgment message indicating the set of UE identifiers including the identifier of the UE, the one or more machine learning functions, or any combination thereof, wherein the second control message is output based at least in part on the activation acknowledgment message.

Aspect 11: The method of any of aspects 8 through 10, further comprising: obtaining, from the UE, a first activation request message indicating the one or more machine learning functions: outputting, to the ML service and in response to the first activation request message, a second activation request message indicating a set of UE identifiers including an identifier of the UE, the one or more machine learning functions, or any combination thereof; and obtaining an activation acknowledgment message from the ML service in response to the second activation request message, the activation acknowledgment message indicating the set of UE identifiers including the identifier of the UE, the one or more machine learning functions, or any combination thereof, wherein the second control message is output based at least in part on the activation acknowledgment message.

Aspect 12: The method of any of aspects 1 through 11, further comprising: obtaining a sixth message comprising UE inference input data associated with the one or more machine learning functions: outputting, to the ML service, a service data request message comprising the UE inference input data; and obtaining, from the ML service, a service data response message indicating ML service inference output data associated with the one or more machine learning functions.

Aspect 13: The method of aspect 12, further comprising: outputting, to the UE, a seventh message comprising the ML service inference output data from the ML service.

Aspect 14: The method of any of aspects 12 through 13, further comprising: monitoring for one or more trigger conditions based at least in part on the UE inference input data, ML service inference input data from the ML service, or any combination thereof; and outputting, to the UE, a third control message comprising an indication to switch or deactivate at least one of the one or more machine learning functions based at least in part on an occurrence of the one or more trigger conditions.

Aspect 15: The method of aspect 14, wherein the one or more trigger conditions comprises a measurement of one or more key performance indicators satisfying a key performance indicator threshold.

Aspect 16: The method of any of aspects 14 through 15, further comprising: outputting, to the ML service, a monitoring report that indicates one or more key performance indicators associated with the one or more machine learning functions.

Aspect 17: The method of any of aspects 14 through 16, wherein the one or more trigger conditions are based at least in part on a monitoring report comprising measurements performed by the UE, by the network entity, or any combination thereof.

Aspect 18: The method of any of aspects 1 through 17, further comprising: obtaining a monitoring report from the UE, the monitoring report comprising one or more key performance indicators associated with the one or more machine learning functions; and outputting, to the UE, an indication to switch or deactivate the one or more machine learning functions of the UE based at least in part on an occurrence of one or more trigger conditions.

Aspect 19: The method of aspect 18, further comprising: outputting, to the ML service, a monitoring report that indicates one or more key performance indicators associated with the one or more machine learning functions.

Aspect 20: The method of any of aspects 1 through 19, further comprising: obtaining, from the UE, LCM control request message comprising a request for life cycle management control signaling, the life cycle management control signaling comprising an indication for activating, deactivating, switching, a default configuration, or any combination thereof, of the one or more cross-node machine learning configurations: outputting, to the ML service, a first LCM control message comprising an indication of request for the LCM control signaling in response to the LCM control request message; and outputting, to the UE, a second LCM control message comprising and indication of the life cycle management control signaling indicated by the ML service.

Aspect 21: The method of aspect 20, wherein obtaining the LCM control request message is based at least in part on a monitoring report from the UE, the network entity, or a combination thereof.

Aspect 22: A method for wireless communications at a UE, comprising: receiving a first message indicating one or more life cycle management trigger conditions for a channel between the UE and a network entity: transmitting, to the network entity, a LCM control request message comprising a request for life cycle management control signaling in response to an occurrence of the one or more life cycle management trigger conditions, wherein the life cycle management control signaling comprises an indication for activating, deactivating, switching, a default configuration, or any combination thereof, of one or more cross-node machine learning configurations for the UE; and receiving, from the network entity, a second message indicating the life cycle management control signaling in response to the LCM control request message.

Aspect 23: The method of aspect 22, further comprising: transmitting, to the network entity, a monitoring report that indicates one or more key performance indicators associated with the UE, wherein receiving the second message indicating the life cycle management control signaling is based at least in part on the monitoring report.

Aspect 24: The method of any of aspects 22 through 23, wherein the one or more life cycle management trigger conditions comprise one or more thresholds associated an inference performance of the UE, one or more key performance indicators associated with the UE, or a combination thereof.

Aspect 25: A network entity for wireless communications, comprising one or more memories storing processor-executable code, and one or more processors coupled with the one or more memories and individually or collectively operable to execute the code to cause the network entity to perform a method of any of aspects 1 through 21.

Aspect 26: A network entity for wireless communications, comprising at least one means for performing a method of any of aspects 1 through 21.

Aspect 27: A non-transitory computer-readable medium storing code for wireless communications, the code comprising instructions executable by a processor to perform a method of any of aspects 1 through 21.

Aspect 28: A UE for wireless communications, comprising one or more memories storing processor-executable code, and one or more processors coupled with the one or more memories and individually or collectively operable to execute the code to cause the UE to perform a method of any of aspects 22 through 24.

Aspect 29: A UE for wireless communications, comprising at least one means for performing a method of any of aspects 22 through 24.

Aspect 30: A non-transitory computer-readable medium storing code for wireless communications, the code comprising instructions executable by a processor to perform a method of any of aspects 22 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" may include calculating, computing, processing, deriving, investigating, looking up (such as via looking up in a table, a database or another data structure), ascertaining and the like. Also, "determining" may include receiving (e.g., receiving information), accessing (e.g., accessing data stored in memory)

and the like. Also, "determining" may include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:
one or more memories storing processor-executable code; and
one or more processors coupled with the one or more memories and individually or collectively operable to execute the code to cause the network entity to:
obtain a first message indicating one or more machine learning capabilities of a user equipment (UE);
obtain, from a machine learning service separate from the network entity, a second message indicating one or more machine learning service capabilities of the machine learning service, wherein the one or more machine learning service capabilities correspond to a list of functions supported by the machine learning service; and
output, to the UE, a control message indicating one or more cross-node machine learning configurations based at least in part on the one or more machine learning capabilities of the UE and the one or more machine learning service capabilities of the machine learning service, wherein the one or more cross-node machine learning configurations configure one or more machine learning functions of the UE for use with the machine learning service.

2. The network entity of claim 1, wherein the one or more processors are individually or collectively further operable to execute the code to cause the network entity to:
output, to the machine learning service, a service capability request message for the one or more machine learning service capabilities, wherein the second message indicating the one or more machine learning service capabilities is obtained in response to the service capability request message, and wherein the one or more machine learning service capabilities comprise capabilities that are compatible with the UE based at least in part on the one or more machine learning capabilities of the UE.

3. The network entity of claim 2, wherein the service capability request message comprises a set of UE identifiers including an identifier of the UE, an indication of the one or more machine learning capabilities of to the UE, or any combination thereof.

4. The network entity of claim 1, wherein, to obtain the second message indicating the one or more machine learning service capabilities, the one or more processors are individually or collectively operable to execute the code to cause the network entity to:

obtain, from the machine learning service, an announcement of the one or more machine learning service capabilities, the announcement comprising the second message.

5. The network entity of claim 1, wherein the one or more processors are individually or collectively further operable to execute the code to cause the network entity to:

select, based at least in part on the one or more machine learning capabilities of the UE and the one or more machine learning service capabilities of the machine learning service, the one or more machine learning functions;

output, to the machine learning service, a configuration request message requesting the one or more cross-node machine learning configurations based at least in part on the selecting; and obtain, from the machine learning service, a configuration response message that indicates the one or more cross-node machine learning configurations, the one or more machine learning functions, a set of UE identifiers including an identifier of the UE, or any combination thereof, wherein the control message indicating the one or more cross-node machine learning configurations is based at least in part on obtaining the configuration response message.

6. The network entity of claim 1, wherein the one or more processors are individually or collectively further operable to execute the code to cause the network entity to:

obtain a third message indicating completion of the one or more cross-node machine learning configurations by the UE in response to the control message.

7. The network entity of claim 6, wherein the one or more processors are individually or collectively further operable to execute the code to cause the network entity to:

output, to the machine learning service, a fourth message indicating that the one or more cross-node machine learning configurations have been configured by the UE.

8. The network entity of claim 1, wherein the one or more processors are individually or collectively further operable to execute the code to cause the network entity to:

output a second control message comprising an indication to activate the one or more machine learning functions based at least in part on the one or more cross-node machine learning configurations.

9. The network entity of claim 8, wherein the one or more processors are individually or collectively further operable to execute the code to cause the network entity to:

output, to the machine learning service, an activation request message indicating a set of UE identifiers including an identifier of the UE, the one or more machine learning functions, or any combination thereof; and obtain, from the machine learning service, an activation acknowledgment message from the machine learning service in response to the activation request message, the activation acknowledgment message indicating the set of UE identifiers including the identifier of the UE, the one or more machine learning functions, or any combination thereof, wherein the second control message is output based at least in part on the activation acknowledgment message.

10. The network entity of claim 8, wherein the one or more processors are individually or collectively further operable to execute the code to cause the network entity to:

obtain, from the machine learning service, an activation request message indicating a set of UE identifiers including an identifier of the UE, the one or more machine learning functions, or any combination thereof; and output, to the machine learning service, an activation acknowledgment message from the machine learning service in response to the activation request message, the activation acknowledgment message indicating the set of UE identifiers including the identifier of the UE, the one or more machine learning functions, or any combination thereof, wherein the second control message is output based at least in part on the activation acknowledgment message.

11. The network entity of claim 8, wherein the one or more processors are individually or collectively further operable to execute the code to cause the network entity to:

obtain, from the UE, a first activation request message indicating the one or more machine learning functions;

output, to the machine learning service and in response to the first activation request message, a second activation request message indicate a set of UE identifiers including an identifier of the UE, the one or more machine learning functions, or any combination thereof; and obtain an activation acknowledgment message from the machine learning service in response to the second activation request message, the activation acknowledgment message indicating the set of UE identifiers including the identifier of the UE, the one or more machine learning functions, or any combination thereof, wherein the second control message is output based at least in part on the activation acknowledgment message.

12. The network entity of claim 1, wherein the one or more processors are individually or collectively further operable to execute the code to cause the network entity to:

obtain a sixth message comprising UE inference input data associated with the one or more machine learning functions;

output, to the machine learning service, a service data request message comprising the UE inference input data; and obtain, from the machine learning service, a service data response message indicating machine learning service inference output data associated with the one or more machine learning functions.

13. The network entity of claim 12, wherein the one or more processors are individually or collectively further operable to execute the code to cause the network entity to:

output, to the UE, a seventh message comprise the machine learning service inference output data from the machine learning service.

14. The network entity of claim 12, wherein the one or more processors are individually or collectively further operable to execute the code to cause the network entity to:

monitor for one or more trigger conditions based at least in part on the UE inference input data, machine learning service inference input data from the machine learning service, or any combination thereof; and output, to the UE, a third control message that comprises an indication to switch or deactivate at least one of the one or more machine learning functions based at least in part on an occurrence of the one or more trigger conditions.

15. The network entity of claim 14, wherein the one or more trigger conditions comprises a measurement of one or more key performance indicators satisfying a key performance indicator threshold.

16. The network entity of claim 14, wherein the one or more processors are individually or collectively further operable to execute the code to cause the network entity to:

output, to the machine learning service, a monitoring report that indicates one or more key performance indicators associated with the one or more machine learning functions.

17. The network entity of claim 14, wherein the one or more trigger conditions are based at least in part on a monitoring report comprising measurements performed by the UE, by the network entity, or any combination thereof.

18. The network entity of claim 1, wherein the one or more processors are individually or collectively further operable to execute the code to cause the network entity to:

obtain a monitoring report from the UE, the monitoring report comprising one or more key performance indicators associated with the one or more machine learning functions; and output, to the UE, an indication to switch or deactivate the one or more machine learning functions of the UE based at least in part on an occurrence of one or more trigger conditions.

19. The network entity of claim 18, wherein the one or more processors are individually or collectively further operable to execute the code to cause the network entity to:

output, to the machine learning service, a monitoring report that indicates one or more key performance indicators associated with the one or more machine learning functions.

20. The network entity of claim 1, wherein the one or more processors are individually or collectively further operable to execute the code to cause the network entity to:

obtain, from the UE, a life cycle management control request message comprising a request for life cycle management control signaling, the life cycle management control signaling comprising an indication for activating, deactivating, switching, a default configuration, or any combination thereof, of the one or more cross-node machine learning configurations;

output, to the machine learning service, a first life cycle management control message that comprises an indication of request for the life cycle management control signaling in response to the life cycle management control request message; and output, to the UE, a second life cycle management control message comprising and indication of the life cycle management control signaling indicated by the machine learning service.

21. The network entity of claim 20, wherein obtaining the life cycle management control request message is based at least in part on a monitoring report from the UE, the network entity, or a combination thereof.

22. A user equipment (UE), comprising:

one or more memories storing processor-executable code; and one or more processors coupled with the one or more memories and individually or collectively operable to execute the code to cause the UE to:

receive a first message indicating one or more life cycle management trigger conditions for a channel between the UE and a network entity;

transmit, to the network entity, a life cycle management control request message comprising a request for life cycle management control signaling in response to an occurrence of the one or more life cycle management trigger conditions, wherein the life cycle management control signaling comprises an indication for activating, deactivating, switching, a default configuration, or any combination thereof, of one or more cross-node machine learning configurations for the UE; and receive, from the network entity, a second message indicating the life cycle management control signaling in response to the life cycle management control request message.

23. The UE of claim 22, wherein the one or more processors are individually or collectively further operable to execute the code to cause the UE to:

transmit, to the network entity, a monitor report that indicates one or more key performance indicators associated with the UE, wherein receiving the second message indicating the life cycle management control signaling is based at least in part on the monitor report.

24. The UE of claim 22, wherein the one or more life cycle management trigger conditions comprise one or more thresholds associated an inference performance of the UE, one or more key performance indicators associated with the UE, or a combination thereof.

25. A method for wireless communications at a network entity, comprising:

obtaining a first message indicating one or more machine learning capabilities of a user equipment (UE);

obtaining, from a machine learning service separate from the network entity, a second message indicating one or more machine learning service capabilities of the machine learning service, wherein the one or more machine learning service capabilities correspond to a list of functions supported by the machine learning service; and outputting, to the UE, a control message indicating one or more cross-node machine learning configurations based at least in part on the one or more machine learning capabilities of the UE and the one or more machine learning service capabilities of the machine learning service, wherein the one or more cross-node machine learning configurations configure one or more machine learning functions of the UE for use with the machine learning service.

26. The method of claim 25, further comprising:

outputting, to the machine learning service, a service capability request message for the one or more machine learning service capabilities, wherein the second message indicating the one or more machine learning service capabilities is obtained in response to the service capability request message, and wherein the one or more machine learning service capabilities comprise capabilities that are compatible with the UE based at least in part on the one or more machine learning capabilities of the UE.

27. The method of claim 26, wherein the service capability request message comprises a set of UE identifiers including an identifier of the UE, an indication of the one or more machine learning capabilities of to the UE, or any combination thereof.

28. The method of claim 25, wherein obtaining the second message indicating the one or more machine learning service capabilities comprises:

obtaining, from the machine learning service, an announcement of the one or more machine learning service capabilities, the announcement comprising the second message.

29. A method for wireless communications at a user equipment (UE), comprising:

receiving a first message indicating one or more life cycle management trigger conditions for a channel between the UE and a network entity;

transmitting, to the network entity, a life cycle management control request message comprising a request for life cycle management control signaling in response to an occurrence of the one or more life cycle management trigger conditions, wherein the life cycle management control signaling comprises an indication for activating, deactivating, switching, a default configuration, or any combination thereof, of one or more cross-node machine learning configurations for the UE; and receiving, from the network entity, a second message indicating the life cycle management control signaling in response to the life cycle management control request message.

30. The method of claim 29, further comprising:

transmitting, to the network entity, a monitoring report that indicates one or more key performance indicators associated with the UE, wherein receiving the second message indicating the life cycle management control signaling is based at least in part on the monitoring report.

\* \* \* \* \*